United States Patent
Uno et al.

(10) Patent No.: US 10,704,964 B2
(45) Date of Patent: Jul. 7, 2020

(54) TEMPERATURE MEASUREMENT DEVICE, TEMPERATURE MEASUREMENT METHOD, AND COMPUTER-READABLE NON-TRANSITORY MEDIUM

(71) Applicant: FUJITSU LIMITED, Kawasaki-shi, Kanagawa (JP)

(72) Inventors: Kazushi Uno, Atsugi (JP); Takeo Kasajima, Machida (JP); Takahiro Arioka, Isehara (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 435 days.

(21) Appl. No.: 15/789,408

(22) Filed: Oct. 20, 2017

(65) Prior Publication Data
US 2018/0058948 A1    Mar. 1, 2018

Related U.S. Application Data

(63) Continuation of application No. PCT/JP2015/063838, filed on May 13, 2015.

(51) Int. Cl.
G01K 11/32    (2006.01)

(52) U.S. Cl.
CPC ........ *G01K 11/32* (2013.01); *G01K 2011/324* (2013.01)

(58) Field of Classification Search
CPC ...... G01K 15/00; G01K 11/3206; G01K 3/06; G01K 2011/324; G01K 2011/322;
(Continued)

(56) References Cited

U.S. PATENT DOCUMENTS

| 4,823,166 A | 4/1989 | Hartog |
| 5,825,804 A * | 10/1998 | Sai .................. G01K 11/32 |
| | | 374/137 |

(Continued)

FOREIGN PATENT DOCUMENTS

| JP | S62-110160 A | 5/1987 |
| JP | H01-232228 A | 9/1989 |

(Continued)

OTHER PUBLICATIONS

Fujitsu Laboratories Ltd.; "Development of real-time and many-points temperature measurement technology for data center;" Press Release; Apr. 4, 2008; (https://pr.fujitsu.com/jp/news/2008/04/4.html); (4 Sheets, 1 Sheet translation, 5 Sheets total).

(Continued)

*Primary Examiner* — Gail Kaplan Verbitsky
(74) *Attorney, Agent, or Firm* — Kratz, Quintos & Hanson, LLP

(57) ABSTRACT

A temperature measurement device includes: a detector to detect a first Stokes component and a first anti-Stokes component when a light is input into a first end of an optical fiber and detect a second Stokes component and a second anti-Stokes component when a light is input into a second end; and a processor configured to execute a process comprising: replacing the second anti-Stokes component with a value according to the first Stokes component, the first anti-Stokes component and the second Stokes component when any one of correlations of the second anti-Stokes component to the first Stokes component and the first anti-Stokes component is less than or equal to a threshold value; and measuring a temperature at the sample point by using the first Stokes component, the first anti-Stokes component, the second Stokes component, and the second anti-Stokes component that is replaced in the replacing.

20 Claims, 41 Drawing Sheets

(58) Field of Classification Search
CPC .............. G01D 5/35364; G01D 5/353; G01D 5/35303; G01D 5/3538; G01D 5/25; G01D 5/268; G01J 3/44; G01J 3/0218; G01J 1/0425; G01J 5/0014; G01J 5/0821; G01N 2021/4742; G01N 2201/08; G01N 21/8806
USPC .......................... 374/120, 121, 130, 131, 161
See application file for complete search history.

(56) References Cited

U.S. PATENT DOCUMENTS

| 2012/0033709 | A1 | 2/2012 | Kasajima | |
|---|---|---|---|---|
| 2013/0100984 | A1 | 4/2013 | Agawa | |
| 2014/0254629 | A1 | 9/2014 | Shida | |
| 2018/0031428 | A1* | 2/2018 | Uno | ................. G01K 11/32 |
| 2019/0072417 | A1* | 3/2019 | Khadour | ................. G01L 1/242 |

FOREIGN PATENT DOCUMENTS

| JP | H02-123304 A | 5/1990 | | |
|---|---|---|---|---|
| JP | H04-332835 A | 11/1992 | | |
| JP | H07-12655 A | 1/1995 | | |
| JP | 2002-267242 A | 9/2002 | | |
| JP | 2003-014554 A | 1/2003 | | |
| JP | 2003-057126 A | 2/2003 | | |
| JP | 2010-156549 A | 7/2010 | | |
| JP | 2013-092388 A | 5/2013 | | |
| JP | 2014-173877 A | 9/2014 | | |
| WO | WO2008047329 A | * | 4/2008 | |
| WO | WO-2009011766 A1 | * | 1/2009 | ............ G01K 15/00 |
| WO | WO2010036360 A | * | 4/2010 | |
| WO | 2010125712 A | 11/2010 | | |

OTHER PUBLICATIONS

Fujitsu Network Solutions; Fujitsu Facility Solution; "Optical fiber temperature measurement system;" (http://www.fujitsu.com/jp/group/fnets/products/opticalfiber/index.html); (9 Sheets, 1 Sheet translation, 10 Sheets total).
International Search Report for International Application No. PCT/JP2015/063838 dated Jul. 28, 2015.

* cited by examiner

FIG. 13

|  | AVERAGE (LOOP METHOD) | INCIDENT TO 0 (m) | INCIDENT TO L (m) |
|---|---|---|---|
| 100~200m | ±6.2 | ±0.8 | ±11.7 |
| 2800~2900m | ±1.9 | ±2.2 | ±3.0 |
| 5600~5700m | ±5.7 | ±11.3 | ±0.9 |

MANAGEMENT OF CIRCUMSTANCE TEMPERATURE

WET GAUZE

MEASUREMENT AND MANAGEMENT OF HUMIDITY (PSYCHROMETER TYPE)

PARTIAL TEMPERATURE CHANGE

TEMPERATURE MANAGEMENT OF FRUIT

MANAGEMENT OF UNDERGROUND TEMPERATURE

FIG. 34

|  | AFTER PROCESS | BEFORE PROCESS |
|---|---|---|
| 100~200m | ±0.9 -85% | ±6.0 |
| 2800~2900m | ±1.9 -0% | ±1.9 |
| 5600~5700m | ±1.0 -83% | ±5.7 |

FIG. 40

|  | AFTER PROCESS | BEFORE PROCESS |
|---|---|---|
| 00~400m | ±1.6 -86% | ±11.5 |
| 2800~2900m | ±3.1 -5% | ±3.3 |
| 5830~5920m | ±2.0 -87% | ±15.0 |

TEMPERATURE MEASUREMENT DEVICE, TEMPERATURE MEASUREMENT METHOD, AND COMPUTER-READABLE NON-TRANSITORY MEDIUM

CROSS-REFERENCE TO RELATED APPLICATIONS

This application is a continuation application of and claim priority to International Application No. PCT/JP2015/063838 filed on May 13, 2015 and designated the U.S., the entire contents of which are incorporated herein by reference.

FIELD

A certain aspect of the embodiments is related to a temperature measurement device, a temperature measurement method and a computer-readable non-transitory medium.

BACKGROUND

There is developed a technology in which a temperature of an optical fiber is measured with use of a back Raman scattering light from the optical fiber when a light is input into the optical fiber from a light source (for example, see Patent Documents 1 to 6).

PRIOR ART DOCUMENT

Patent Document

Patent Document 1: Japanese Laid-open Patent Publication No. 2003-14554
Patent Document 2: Japanese Laid-open Patent Publication No. 2003-57126
Patent Document 3: Japanese Laid-open Patent Publication No. S62-110160
Patent Document 4: Japanese Laid-open Patent Publication No. H07-12655
Patent Document 5: Japanese Laid-open Patent Publication No. H02-123304
Patent Document 6: Japanese Laid-open Patent Publication No. 2002-267242

SUMMARY

According to an aspect of the present invention, there is provided a temperature measurement device including: a detector configured to detect a first Stokes component and a first anti-Stokes component from a back scattering light generated when a light is input into a first end of an optical fiber and detect a second Stokes component and a second anti-Stokes component from a back scattering light generated when a light is input into a second end of the optical fiber; a memory; and a processor configured to execute a process, the process comprising: within a predetermined region including a sample point of a partial region on the first end side of the optical fiber, replacing the second anti-Stokes component with a value according to the first Stokes component, the first anti-Stokes component and the second Stokes component when any one of correlations of the second anti-Stokes component to the first Stokes component and the first anti-Stokes component is less than or equal to a threshold value; and measuring a temperature at the sample point by using the first Stokes component, the first anti-Stokes component, the second Stokes component, and the second anti-Stokes component that is replaced in the replacing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 quantitatively illustrates a measured temperature;

FIG. 34 illustrates a quantitative comparison of temperature distribution before a process and temperature distribution after a process;

FIG. 40 illustrates a quantitative comparison of temperature distribution before a process and temperature distribution after a process.

DESCRIPTION OF EMBODIMENTS

The following is a description of embodiments, with reference to the accompanying drawings.

Embodiment

Figure 1A:
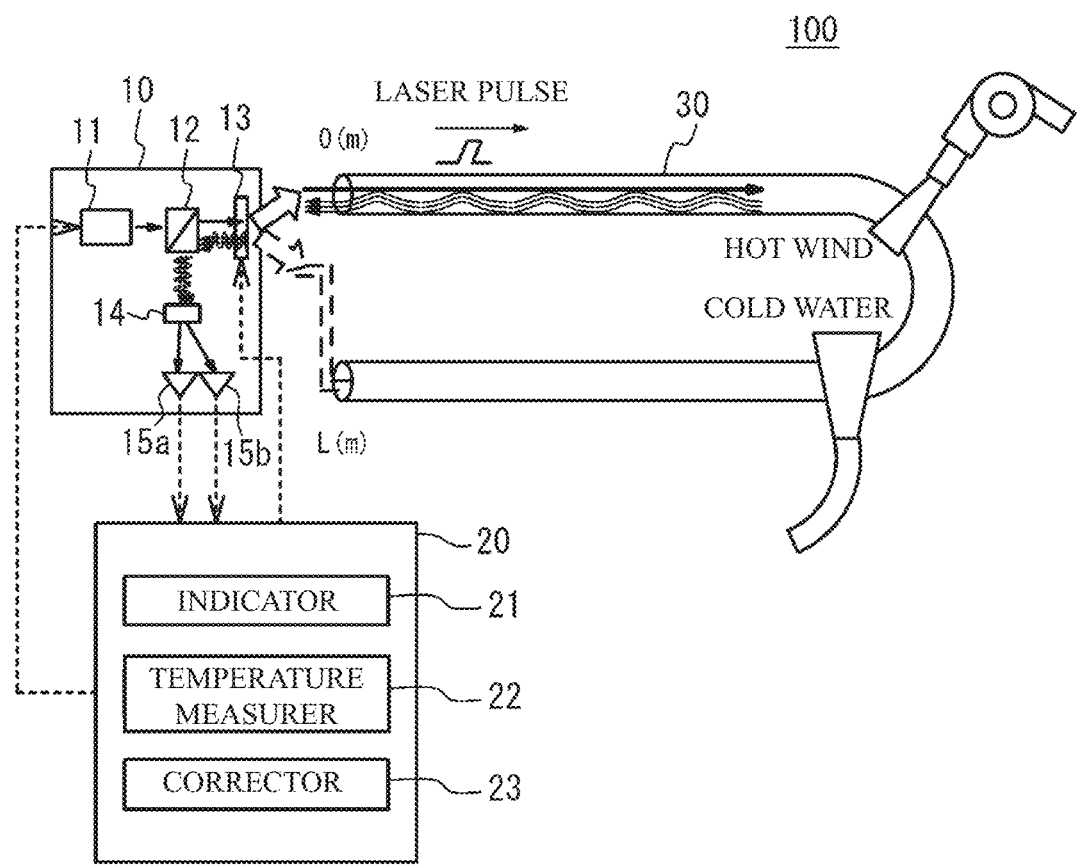
FIG. 1A schematically illustrates an overall structure of a temperature measurement device in accordance with an embodiment.

FIG. 1A schematically illustrates an overall structure of a temperature measurement device 100 in accordance with an embodiment. As illustrated in FIG. 1A, the temperature measurement device 100 has a measurement device 10, a controller 20 and so on. The temperature measurement device 100 is coupled with an optical fiber 30. The measurement device 10 has a laser 11, a beam splitter 12, an optical switch 13, a filter 14, a plurality of detectors 15a and 15b, and so on. The controller 20 has an indicator 21, a temperature measurer 22, a corrector 23 and so on.

Figure 1B:
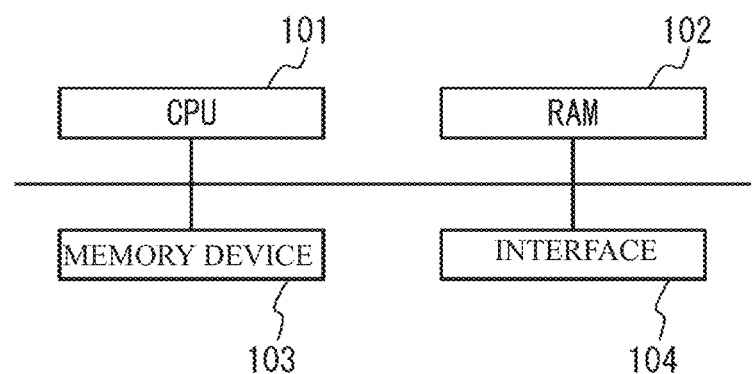
FIG. 1B illustrates a block diagram of a hardware structure of a temperature measurement device.

FIG. 1B illustrates a block diagram of a hardware structure of the controller 20. As illustrated in FIG. 1B, the controller 20 has a CPU 101, a RAM 102, a memory device 103, an interface 104 and so on. The components are connected by a bus or the line. The CPU 101 (Central Processing Unit) is a central processing unit. The CPU 101 has one or more cores. The RAM (Random Access Memory) 102 is a volatile memory that temporarily stores a program executed by the CPU 101, a data processed by the CPU 101, and so on. The memory device 103 is a non-volatile storage device. The memory device 103 may be a ROM (Read Only Memory), a solid state drive (SSD) such as a flash memory, or a hard disk driven by a hard disk drive. When the CPU 101 executes a temperature measurement program stored in the memory device 103, the indicator 21, the temperature measurer 22, the corrector 23 and so on are established in the controller 20. The indicator 21, the temperature measurer 22 and the corrector 23 may be a hardware such as a dedicated circuit or the like.

The laser 11 is a light source such as a semiconductor laser. The laser 11 emits a laser light of a predetermined wavelength range in accordance with an instruction of the indicator 21. In the embodiment, the laser 11 emits an optical pulse (laser pulse) at a predetermined time interval. The beam splitter 12 inputs an optical pulse emitted by the laser 11 into the optical switch 13. The optical switch 13 switches destinations of the optical pulse. The optical switch 13 alternately inputs an optical pulse into a first end and into a second end of the optical fiber 30 at a predetermined cycle in accordance with an instruction of the indicator 21. In the embodiment, a length of the optical fiber 30 is L meter (m). A position of the first end is 0 meter (m). A position of the second end is L meter (m).

The optical pulse input into the optical fiber 30 propagates in the optical fiber 30. The optical pulse generates a forward-scattering light progressing toward a propagation direction and a back-scattering light progressing toward a return direction (returning light), gradually attenuates, and propagates in the optical fiber 30. The back-scattering light passes through the optical switch 13 and is input into the beam splitter 12 again. The back-scattering light input into the beam splitter 12 is emitted toward the filter 14. The filter 14 is a WDM coupler or the like, and extracts a long wavelength component (Stokes component described later) and a short wavelength component (anti-Stokes component) from the back-scattering light. The detectors 15a and 15b are a photo diode. The detector 15a converts light intensity of the short wavelength component of the back-scattering light into an electrical signal and transmits the electrical signal to the temperature measurer 22 and the corrector 23. The detector 15b converts light intensity of the long wavelength component of the back-scattering light into an electrical signal, and transmits the electrical signal into the temperature measurer 22 and the corrector 23. The corrector 23 corrects the anti-Stokes component. The temperature measurer 22 uses the Stokes component and the anti-Stokes component and measures a temperature.

Figure 2:
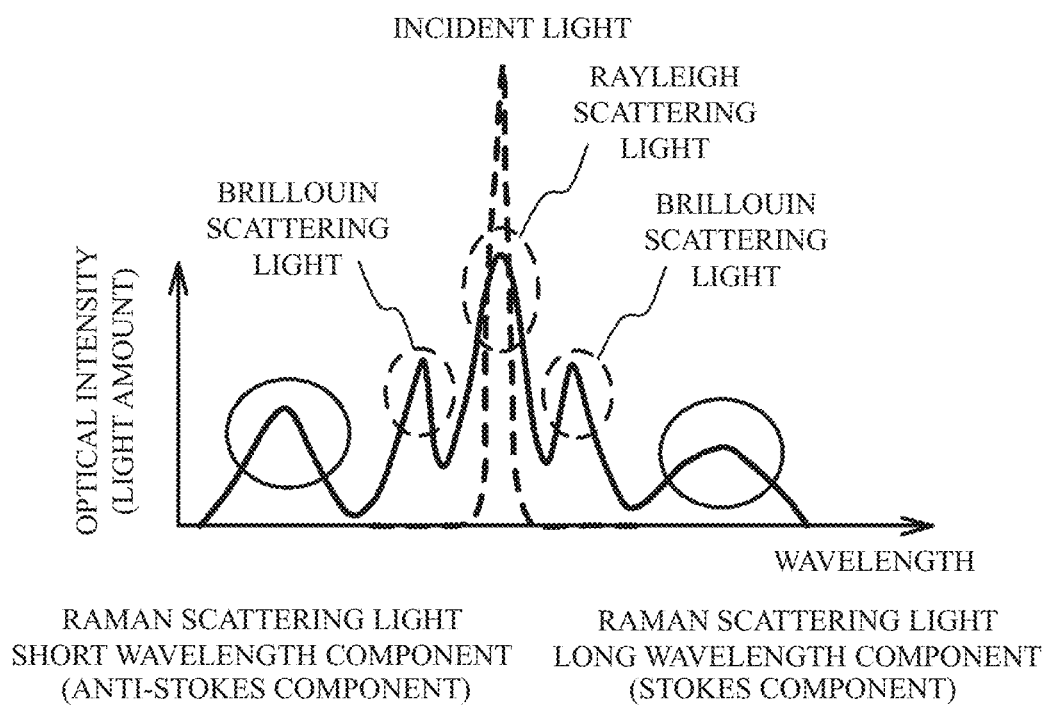
FIG. 2 illustrates components of a back-scattering light.

FIG. 2 illustrates components of the back-scattering light. As illustrated in FIG. 2, the back-scattering light is roughly classified into three types. The three types of light are a Rayleigh scattering light used for an OTDR (Optical Time Domain Reflectometer), a Brillouin scattering light used for distortion measurement, and a Raman scattering light used for temperature measurement, in descending order according to optical intensity and in short-distance order with respect to the input optical wavelength. The Rama scattering light is generated by interference between a lattice oscillation and a light changing according to a temperature in the optical fiber 30. A short wavelength component called anti-Stokes component is generated by intensified interference. A long wavelength component called Stokes component is generated by weakened interference.

Figure 3A:
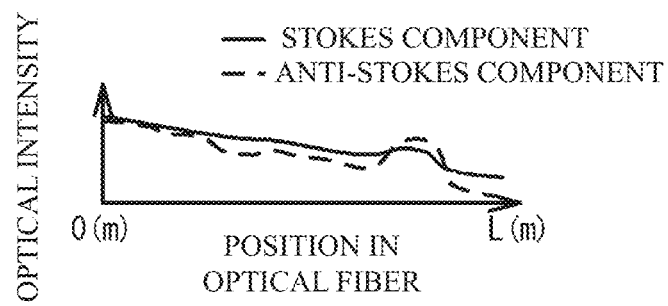
FIG. 3A illustrates a relationship between an elapsed time after optical pulse emission by a laser and optical intensities of a Stokes component and an anti-Stokes component.

FIG. 3A illustrates a relationship between an elapsed time after optical pulse emission by the laser 11 and optical intensities of the Stokes component (long wavelength component) and the anti-Stokes component (short wavelength component). The elapsed time corresponds to a propagation distance of the optical fiber 30 (a position in the optical fiber 30). As illustrated in FIG. 3A, the optical intensities of the Stokes component and the anti-Stokes component are gradually reduced as time passes. This is because the optical pulse propagates in the optical fiber 30 and is gradually reduced with generation of the forward scattering light and the back-scattering light.

As illustrated in FIG. 3A, the optical intensity of the anti-Stokes component is stronger than that of the Stokes component at a position where a temperature of the optical fiber 30 is relatively higher. The optical intensity of the anti-Stokes component is weaker than that of the Stokes component at a position where the temperature is relatively lower. It is therefore possible to detect a temperature of each position of the optical fiber 30 when the detectors 15a and 15b detect the both components and a difference of characteristic of the both components is used. A region of a local maximum in FIG. 3A is a part of the optical fiber 30 that is intentionally heated by a drier or the like in FIG. 1A. A region of a local minimum is a part of the optical fiber 30 that is intentionally cooled by cold water or the like in FIG. 1A.

In the embodiment, the temperature measurer 22 measures a temperature with respect to each elapsed time from the Stokes component and the anti-Stokes component. Thus, it is possible to measure a temperature of each position of the optical fiber 30. The temperature measurer 22 measures the temperature of each position of the optical fiber 30 by calculating the temperature in accordance with the following formula (1). A light amount corresponds to an optical intensity. When a ratio of the two components is used, a difference between the two weak components is enhanced. And, a practical value can be obtained. A gain and an offset depend on a design of the optical fiber 30. Therefore, the gain and the offset are calibrated in advance.

Temperature=gain/{offset−2×ln(an anti-Stokes light amount/a Stokes light amount)}  (1)

Figure 3B:
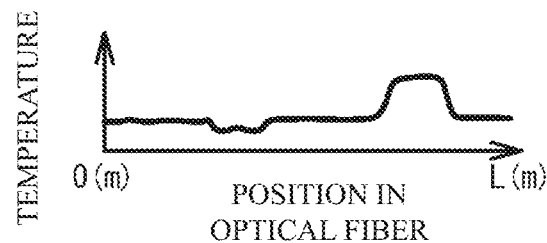
FIG. 3B illustrates a temperature calculated with use of a detection result of FIG. 3A and a formula (1)

FIG. 3B illustrates a temperature calculated with use of a detection result of FIG. 3A and the above-mentioned formula (1). A horizontal axis of FIG. 3B is a position of the optical fiber 30 calculated on the basis of the elapsed time. As illustrated in FIG. 3B, when the Stokes component and the anti-Stokes component are detected, the temperature of each position of the optical fiber 30 can be measured. The laser 11 emits an optical pulse into the optical fiber 30 at a constant cycle. A spatial resolution increases as a pulse width of the optical pulse becomes narrower. On the other hand, the light amount becomes smaller (darker) as the pulse width gets narrower. It is necessary to enlarge a peak level of the pulse for that. The response is changed so that the gain in the above-mentioned formula becomes non-linear.

When an incident position to the optical fiber 30 from the optical switch 13 is fixed to one of the first end and the second end, the temperature measurement with use of the above-mentioned formula (1) can be achieved. When the incident position is alternately switched to the first end and the second end at a constant cycle as in the case of the embodiment, the anti-Stokes light amount and the Stokes light amount are averaged with respect to the position of the optical fiber 30 (calculation of an average). The switching method is called a loop type measurement, a double end measurement or a dual end measurement (hereinafter referred to as a double end method).

In the double end method, the above-mentioned formula (1) is changed into the following formula (2). That is, the anti-Stokes light amount and the Stokes light amount are averaged at each position of the optical fiber 30 with use of the above-mentioned formula (1). It is possible to set the offset and the gain by using an average or a larger value during a single end measurement or newly calibrating the offset and the gain.

Temperature=gain/{offset−2×ln(average anti-Stokes light amount/average Stokes light amount)}  (2)

Figure 4:
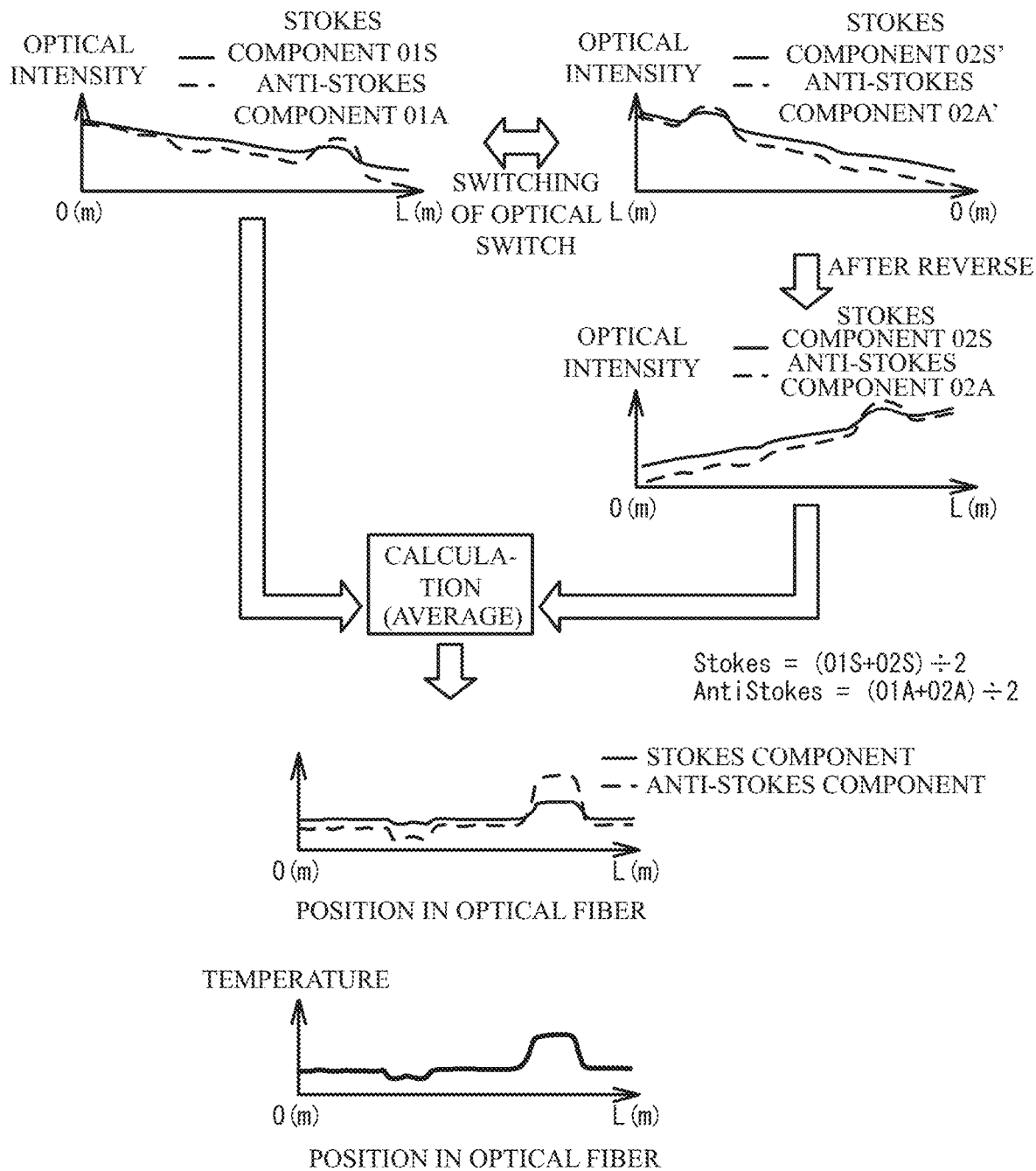
FIG. 4 illustrates details of processes of a double end method.

FIG. 4 illustrates details of processes of the double end method. "01S" indicates the Stokes component of a case where the optical pulse is input into the first end (0 to L). "01A" indicates the anti-Stokes component of the case where the optical pulse is input into the first end (0 to L). "02S" indicates the Stokes component of a case where the optical pulse is input into the second end (L to 0). "02S'" indicates the anti-Stokes component of the case where the optical pulse is input into the second end (L to 0). "02S" and "02A" are obtained when "02S'" and "02A'" detected in the case where the optical pulse is input into the second end are reversed with respect to the elapsed time. By the reversing, it is possible to unify the position.

Figure 5:
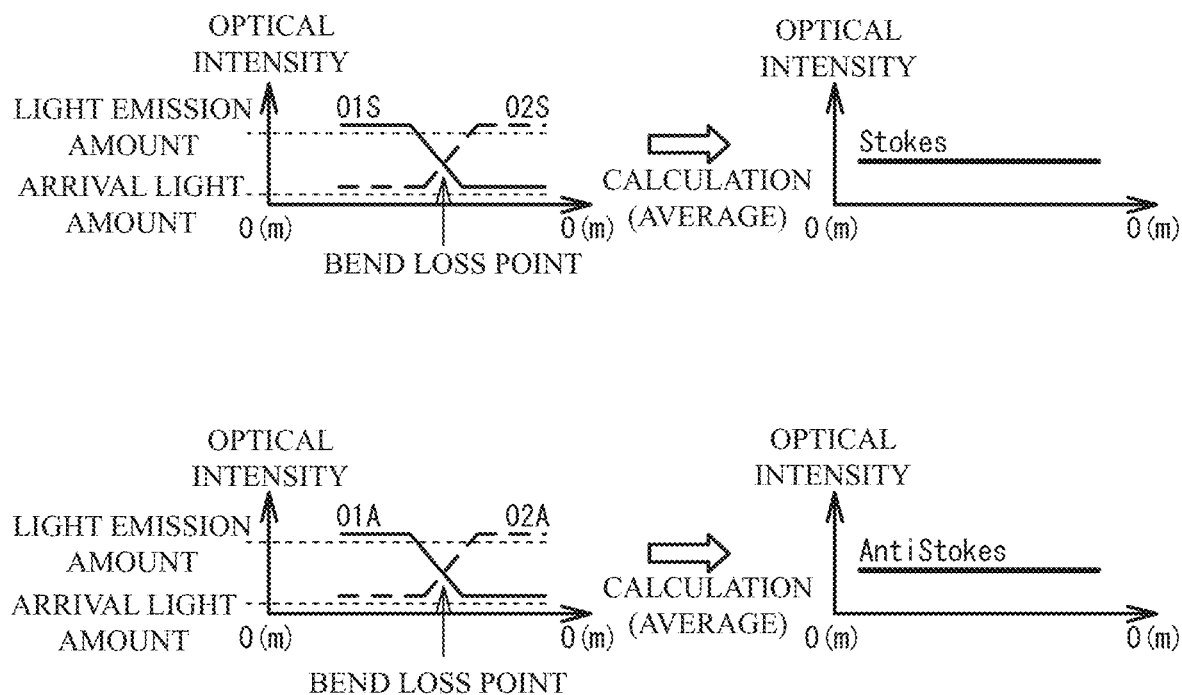
FIG. 5 illustrates merits of a double end method.

FIG. 5 illustrates merits of the double end method. When a path is excessively bent, a transmission loss occurs. And optical intensity sharply decreases at the bent point. When the optical intensity sharply decreases, the ratio of the Stokes component and the anti-Stokes component is changed. The temperature calculated by the above-mentioned formula (2) is generally shifted so as to decrease. With the one end method (hereinafter referred to as a single end method) that is not the double end method, when the pulse is transmitted from the first end (0 meter) to the second end (L meter), the output temperature with respect to the same applied temperature decreases on the second end side compared to the bend loss point. On the other hand, when the pulse is transmitted from the second end (L meter) to the first end (0 meter), the output temperature with respect to the same applied temperature decreases on the first end side compared to the bend loss point.

For example, it is possible to calibrate the temperature at the first end or the second end with use of a resistance temperature detector for the calibration or the like. With the single end method, a value offset may occur at a point away from the calibrated point. On the other hand, with the double end method, there are the following merits when values are averaged. (1) It is possible to cancel the sharp changing before and after the bend loss point. That is, the changing of the loss in the longitudinal direction is canceled. (2) Start edge temperatures of the single end method calibrated with the resistance temperature detector ought to be the same as those of the start edge temperatures of the double end method. It is therefore possible to re-calibrate a gain or an offset value so that the start edge temperatures of the single end method calibrated with the resistance temperature detector are the same as those of the start edge temperatures of the double end method.

Performance of optical fibers in circulation is improved. And there is no unevenness of a refractive index. However, transmission losses having a different value may occur because of bending, extending or connecting to a connector by laying to an object. It is therefore preferable that unique calibration values are given to sections after occurrence of each loss, in order to measure precise temperatures in the single end method. However, it is not necessary to be bothered whether a precise measurement is possible or not, although, in the double end method, it is not possible to compensate for the loss occurring during the measurement and the occurrence of the transmission loss influences on the usage length and is not preferable.

Figure 6:
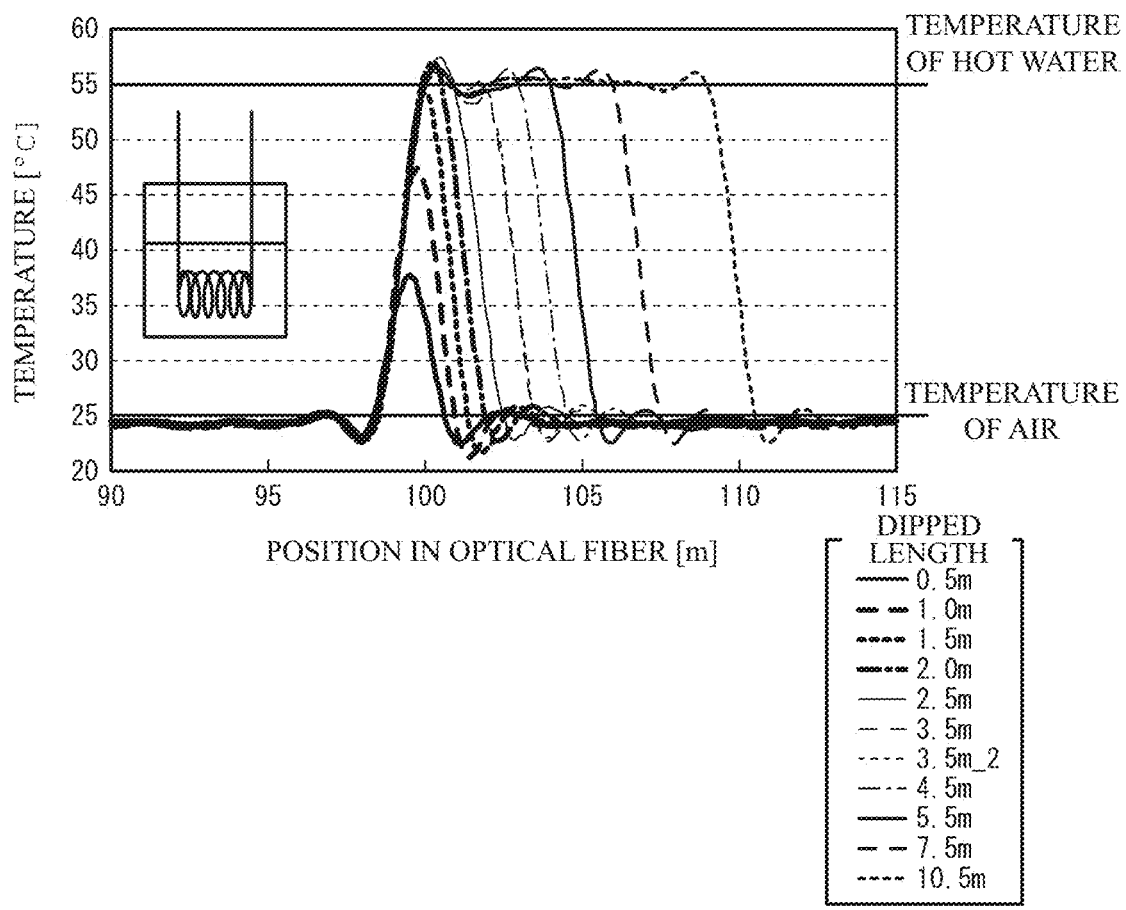
FIG. 6 illustrates a response example of a case where a part of an optical fiber is dipped in hot water of approximately 55 degrees C. when a room temperature is approximately 24 degrees C.

Next, a relationship between a section length of a temperature measurement object in the optical fiber and a measured temperature obtained from the Raman scattering light. FIG. 6 illustrates a response example of a case where a part of the optical fiber 30 is dipped in hot water of approximately 55 degrees C. when a room temperature is approximately 24 degrees C. When the length dipped in the hot water is elongated from 0.5 m to 10.5 m, a peak temperature becomes 55 degrees C. that is the same as that of the hot water in a case where the dipped length is 2 meters or more. It is therefore preferable that the section of the temperature measurement object is elongated in order to measure the precise temperature.

When a temperature obtained by subtracting a precise room temperature from a precise hot water temperature is applied to the optical fiber 30, a sensitivity of the measurement system can be expressed by the following formula (3).

Sensitivity=(a peak temperature of a position dipped in the hot water–a room temperature measured with use of the optical fiber before and after the dipped position)/applied temperature×100(%)  (3)

Figure 7:
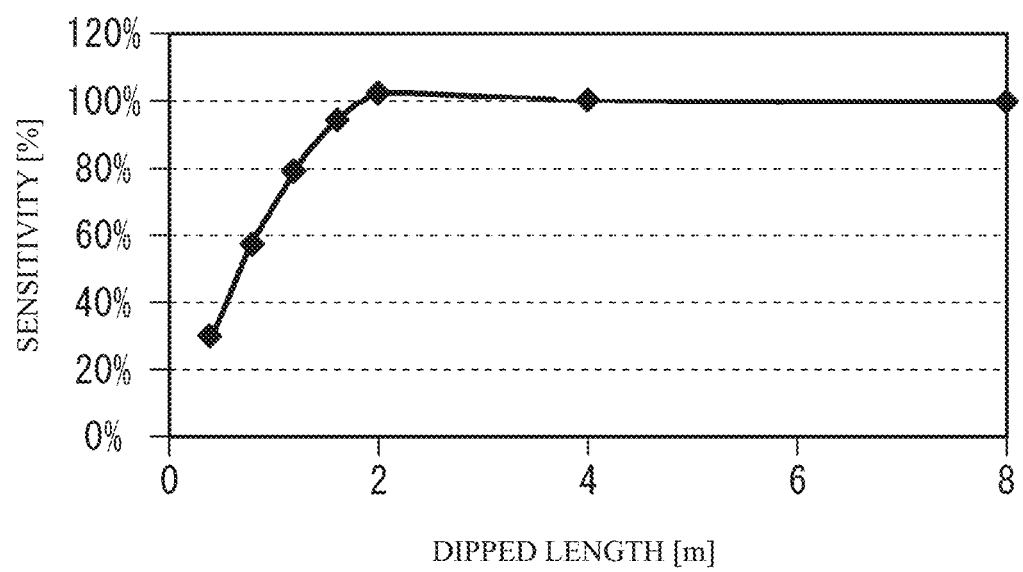
FIG. 7 illustrates results obtained from FIG. 6 and a formula (3)

FIG. 7 illustrates results obtained from FIG. 6 and the above-mentioned formula (3). As illustrated in FIG. 7, a slight overshoot appears. This is because the impulse response of the system is not a Gausian type but the impulse response has a wave form having a minus component closer to sinc function and a high order peak. A minimum length of which sensitivity is 100% or is considered as 100% is called a minimum heated length.

Figure 8:
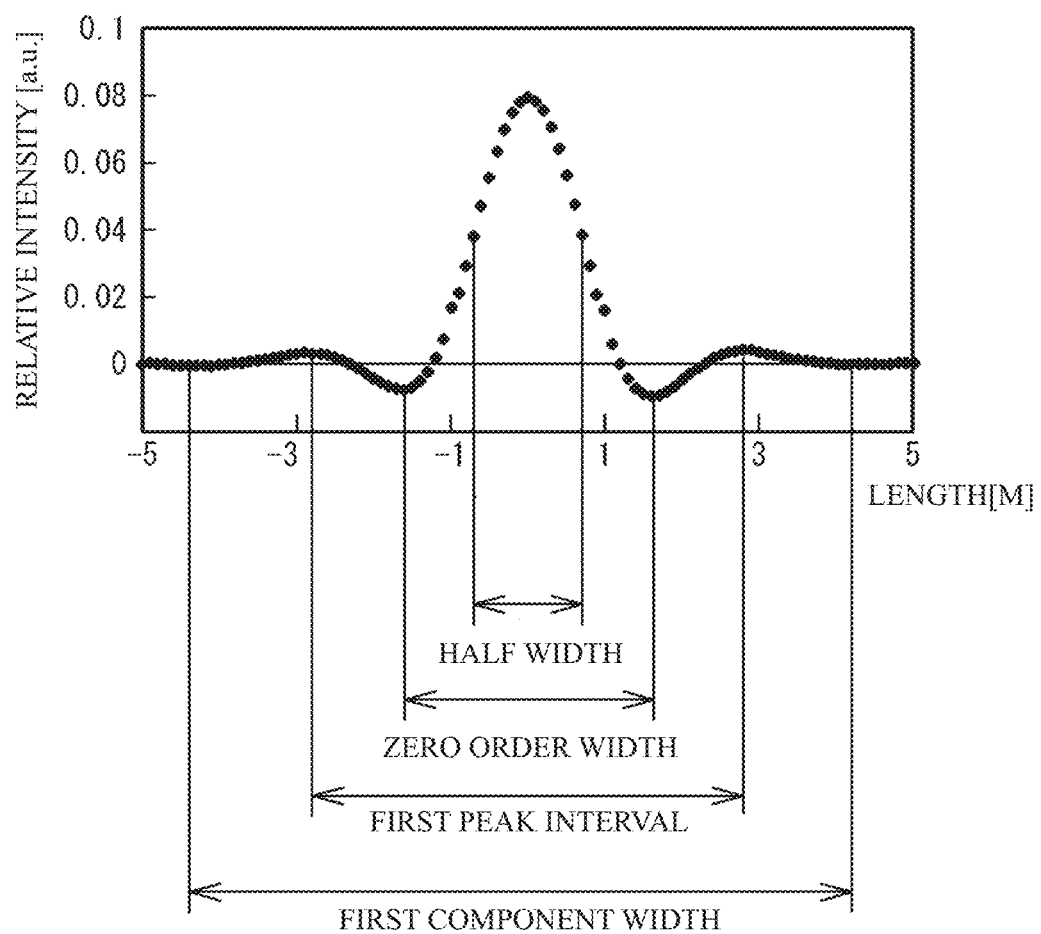
FIG. 8 illustrates a typical example of an impulse response.

From FIG. 6, the temperature in a case where a higher-temperature-applied section (section dipped in hot water) is provided in a constant temperature region may be considered as equivalent to a single square wave to which an impulse response is convolved. Thus, the impulse response of the system is determined. FIG. 8 illustrates a typical example of the calculated impulse response. In the temperature measurement of an optical fiber with use of a back Raman scattering light, as illustrated in FIG. 8, the impulse response may be considered as a wave form in which a window function is applied to a sinc function so that a distance away from a center is smoothly attenuated. The overshoot of the sensitivity curve of FIG. 7 occurs because of the impulse response wave form. When the impulse response is convoluted into applied temperature distribution along the longitudinal direction of the optical fiber 30, it is possible to achieve approximately precise output prediction.

Figure 9A:
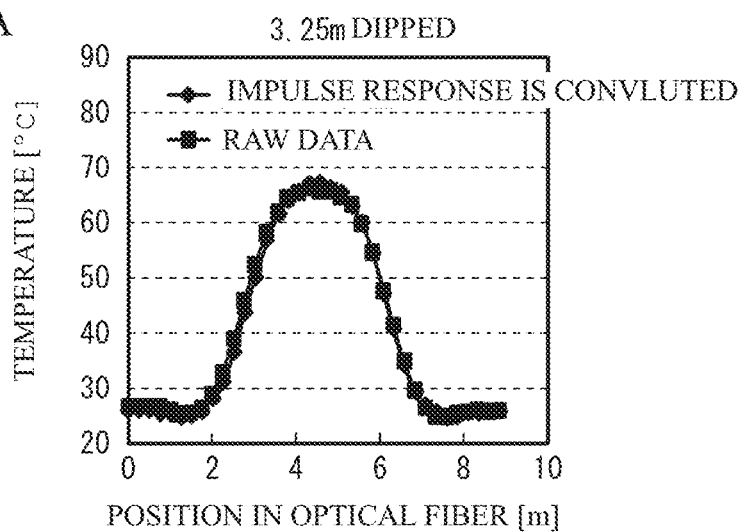
FIG. 9A to FIG. 9C illustrate a comparison between an output wave form that is estimated from an impulse response with respect to each dipped length and an output wave form that is actually obtained.
Figure 9B:
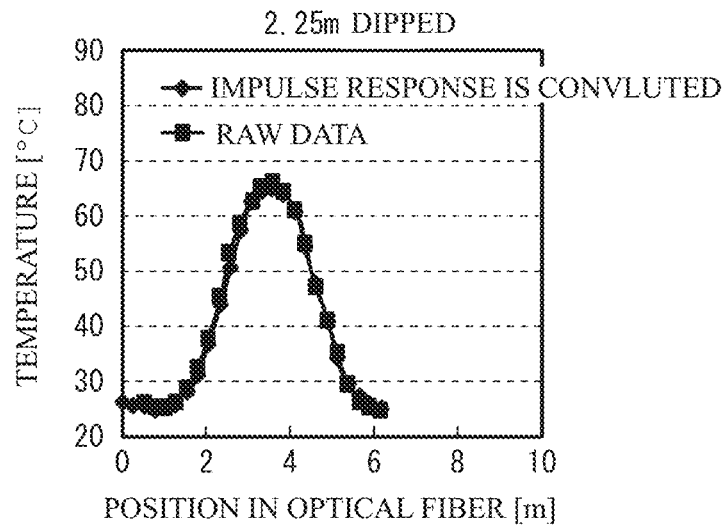
Figure 9C:
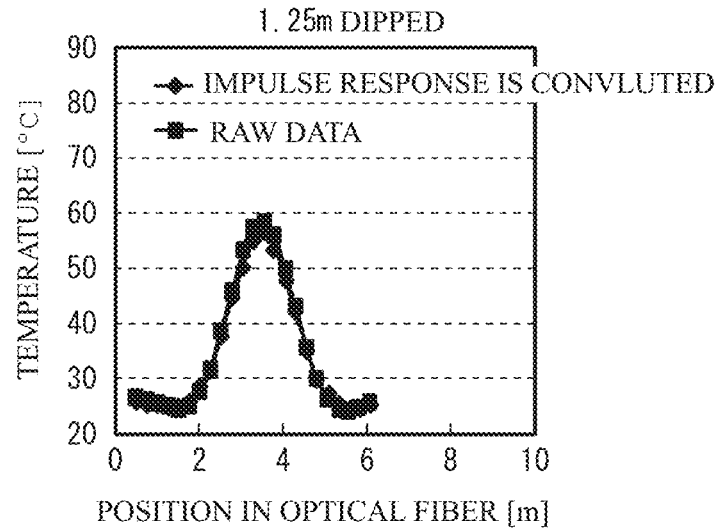

FIG. 9A to FIG. 9C illustrate a comparison between the output wave form that is estimated from the impulse response with respect to each dipped length in the hot water and the output wave form that is actually obtained. As illustrated in FIG. 9A to FIG. 9C, the output wave form can be approximately precisely predicted. When the dipped length in the hot water is 3.25 m, a peaks is smoothed because convolutions of the impulse responses interfere with each other.

Figure 10:
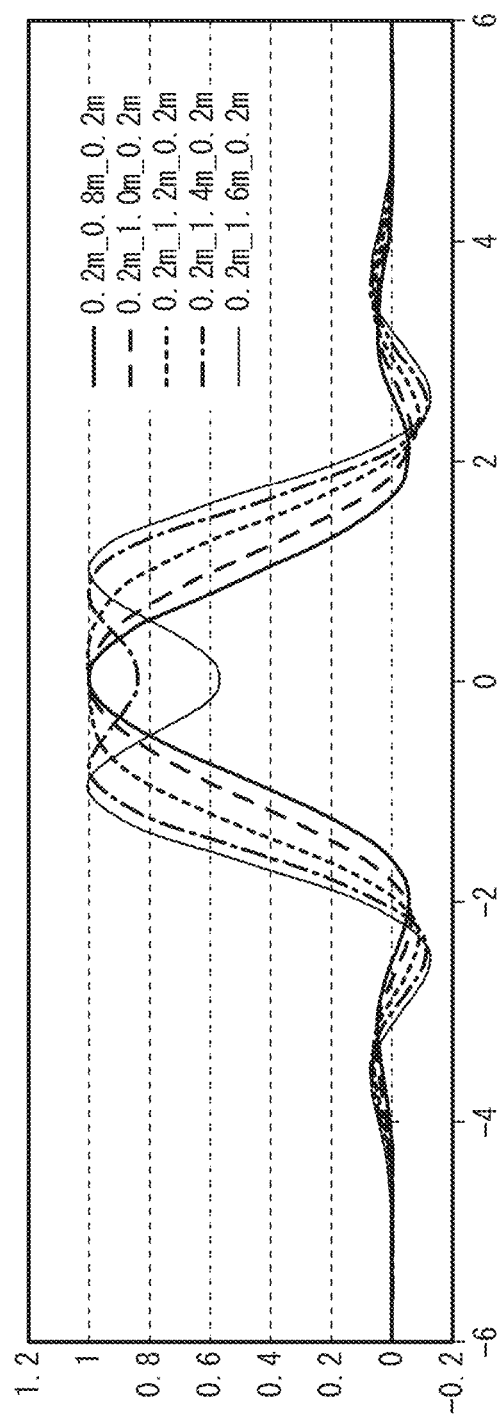
FIG. 10 illustrates a calculated values of output wave forms in a case where a center section to which a high temperature is not applied is provided between two high-temperature-applied sections of 20 cm, and a width of the center section is gradually changed.

And so, FIG. 10 illustrates a calculated values of output wave forms in a case where a center section to which a high temperature is not applied is provided between two high-temperature-applied sections of 20 cm (that is, the center section is exposed to air without dipping in the hot water), and a width of the center section is gradually changed. A peak temperature is normalized into 1. And a reference temperature is normalized into 0. As illustrated in FIG. 10, it may be considered that there are two high-temperature-applied sections when a length of the center section is 1.2 meters to 1.4 meters. This is because interference caused by the enlargement of the impulse response wave form occurs as illustrated in FIG. 8. It is possible to consider that there are two high-temperature-applied sections when a distance between the two high-temperature-applied sections is a half-value width of the impulse response of FIG. 10 or more. It is preferable that the distance is equal to a half value of a zero order component width at which a gradient is reversed or more, in order to determine that the two sections are apparently spaced from each other. That is, from FIG. 10, the distance between the two high-temperature-applied sections is larger than a width of primary peaks and is approximately equal to the primary component width, when a minimum temperature of the center non-heated section is equal to the reference temperature, that is, the interference of the impulse response wave forms can be ignored in FIG. 10.

In order to determine that a temperature changed because of a function of a transfer function a currently focused position of the optical fiber, that is, a temperature is precisely output, it is preferable to focus on a temperature changing of a range of which a center position is the currently focused position and of which a width is equal to a zero order component width or more and a primary component width or less. The optical pulse propagates while gradually spreading and gradually attenuating because of influence such as a widening of a wavelength, an incident angle of view, scattering or the like. It is therefore preferable that the impulse response is measured or calculated at a center position when an optical fiber having a maximum usage length listed in specifications of the optical fiber 30 is connected. Alternatively, it is preferable that values of a near end, a center and a far end are averaged.

In order to measure the temperature with higher accuracy, it is preferable that a plurality of sections are determined so that ranges that are difference ranges between the convolution and the output data illustrated in FIG. 9A to FIG. 9C are not problems are considered as the same, the impulse response is measured or calculated at a center position of each section and is stored, and each impulse response stored with respect to each section is used. With passage of time, the impulse response wave form slightly changes because of degradation of the laser or the like. It is therefore preferable that, in a constant cycle, the impulse response is calibrated at the same position as an initially obtained position in order to measure the temperature with higher accuracy.

Figure 11:
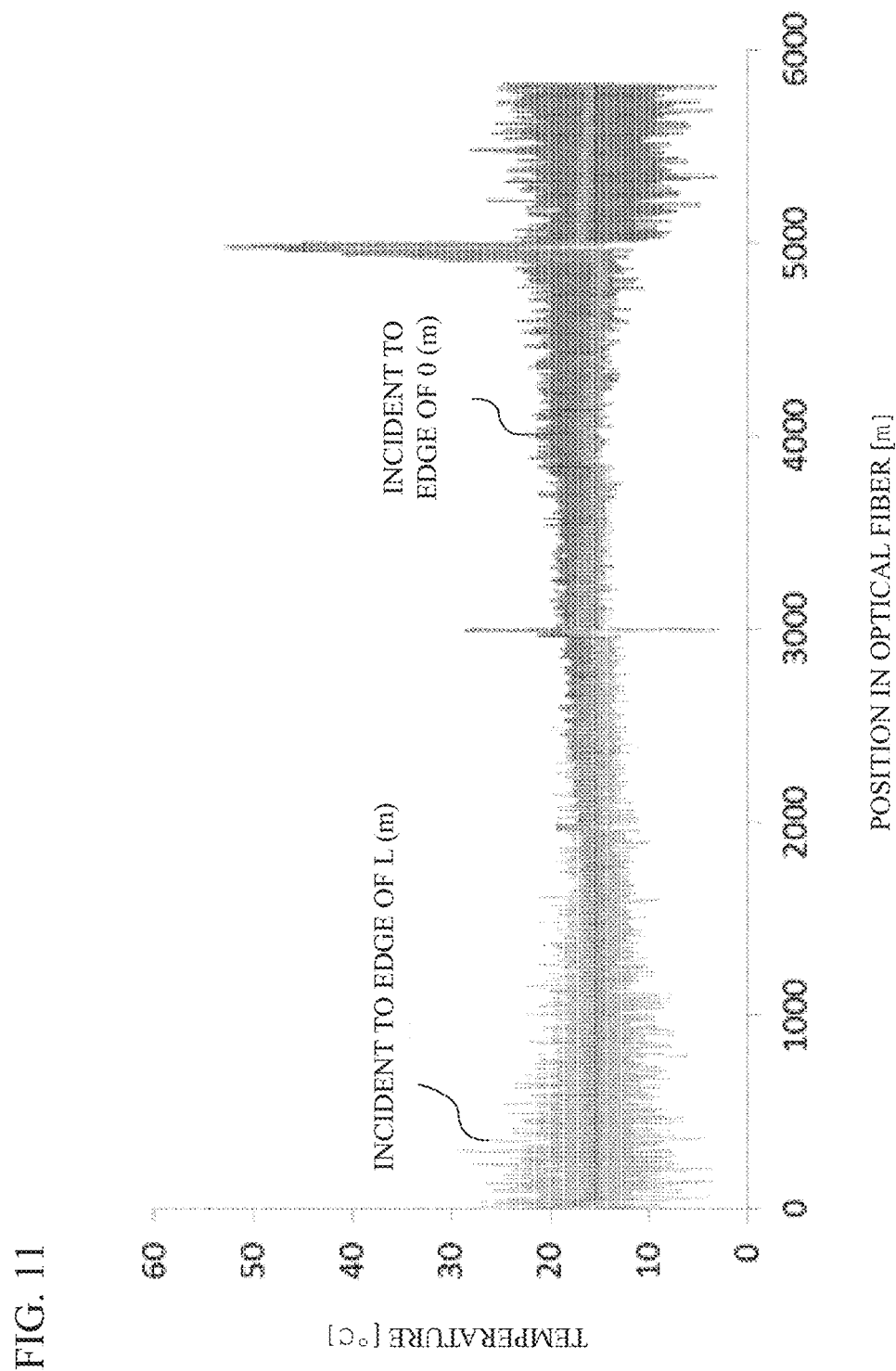
FIG. 11 illustrates an example of temperature distribution measured by detecting a back Raman scattering light in a case where a pulse is input into one end.

FIG. 11 illustrates an example of temperature distribution measured by detecting a back Raman scattering light in a case where the pulse is input into one end. In FIG. 11, a waveform in a case where the pulse is input into the first end (0 meter) illustrated in FIG. 1A and a waveform in a case where the pulse is input into the second end (L meter) illustrated in FIG. 1A are overlapped. When the pulse is input into the first end, variability of the measured temperature is small near the first end. The variability of the measured temperature becomes larger toward the second end. On the other hand, when the pulse is input into the second end, the variability of the measured temperature is small near the second end. The variability of the measured temperature becomes larger toward the first end. A connection position of a connector not cleaned sufficiently is 3000 m or around where the temperature changing is large. The position dipped in the hot water is 4900 m or around. In the example, a path is structured by rolling a plurality of bobbins around the optical fiber 30. Average temperatures of the plurality of the bobbins are slightly different from each other. Therefore, a plurality of differences of level occur. In FIG. 11, the variability becomes larger and the measurement accuracy becomes worse when being away from the light source.

Figure 12:
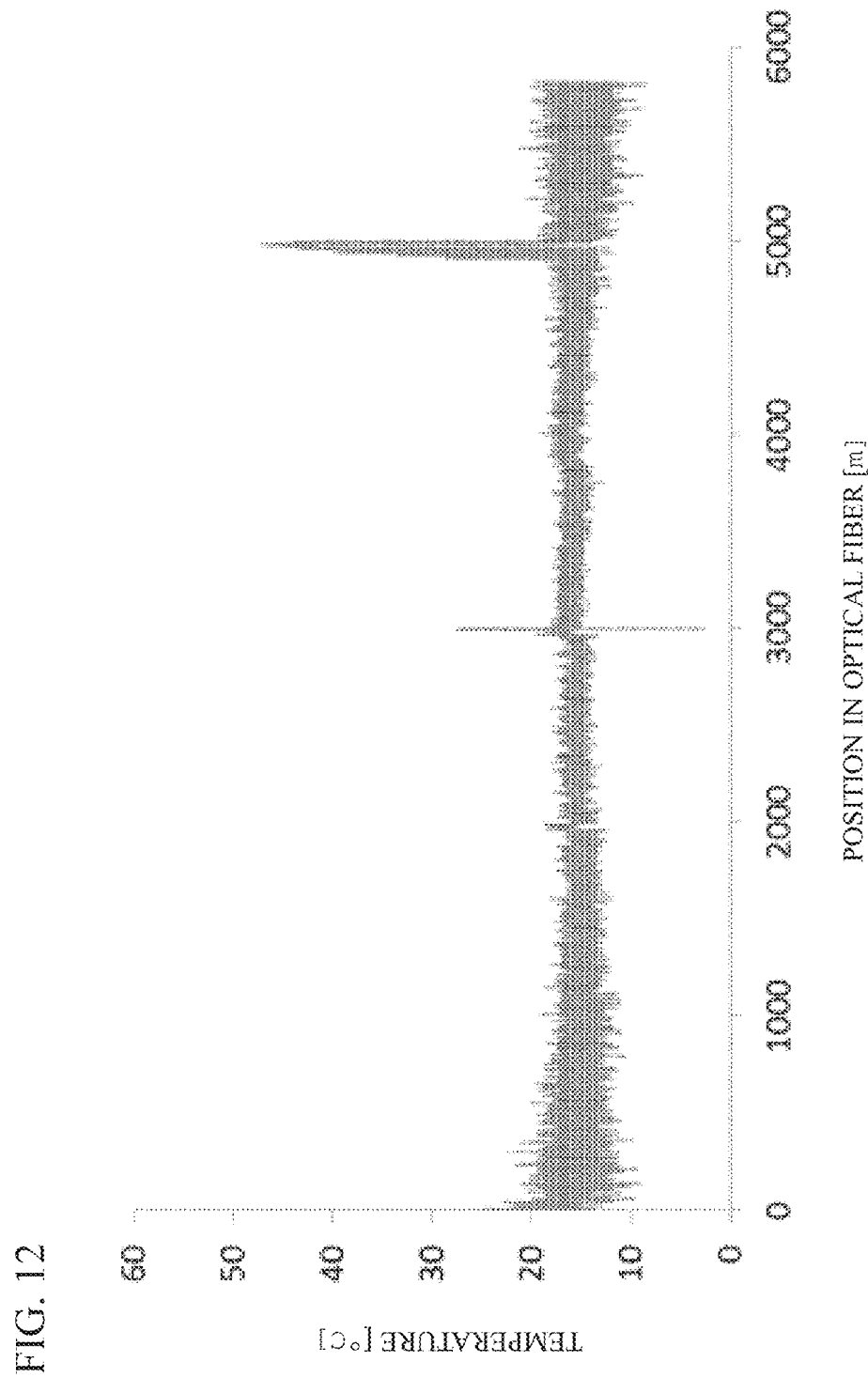
FIG. 12 illustrates a calculated temperature obtained by averaging Stokes components and anti-Stokes components of two signals input from both ends of FIG. 11.

FIG. 12 illustrates a calculated temperature obtained by averaging the Stokes components and the anti-Stokes components of the two signals input from both ends of FIG. 11. By the averaging, the degradation of the measurement accuracy of the end points is suppressed, compared to FIG. 11. However, the measurement accuracy is lower than the preferable end point. FIG. 13 quantitatively illustrates the measured temperature. The measurement accuracy is a value of a standard deviation $3\sigma$ that is calculated with use of values of three points of 100 m of a terrace in which the temperature does not change. It is confirmed that an average (loop method) is an average value of a value of the case where the pulse is input into the 0 m and the value of the case where the pulses is input into L (m).

The temperature measurement using the detection of the back Raman scattering light of an optical fiber is used for detection of fire abnormality of a tunnel, a coal belt conveyor or the like. In the fire detection, accuracy of ±6 degrees C. is not a problem. However, when accuracy of ±1 degrees C. is needed, the accuracy is achieved by 36 $(6/1)^2$ times of the measurement time. For example, it takes 12 minutes for a device capable of achieving the measurement accuracy of FIG. 13 by 20 seconds to achieve the accuracy of ±1 degrees C. It takes 36 minutes for the device capable of achieving the measurement accuracy of FIG. 13 by one minute to achieve the accuracy of ±1 degrees C. The time does not correspond to a real time. Therefore, the usage is limited. It is preferable that the measurement accuracy is improved by post processes without expensive light sources, expensive filters, expensive circuits or the like, in order to use the measurement in a wider field.

Figure 14:
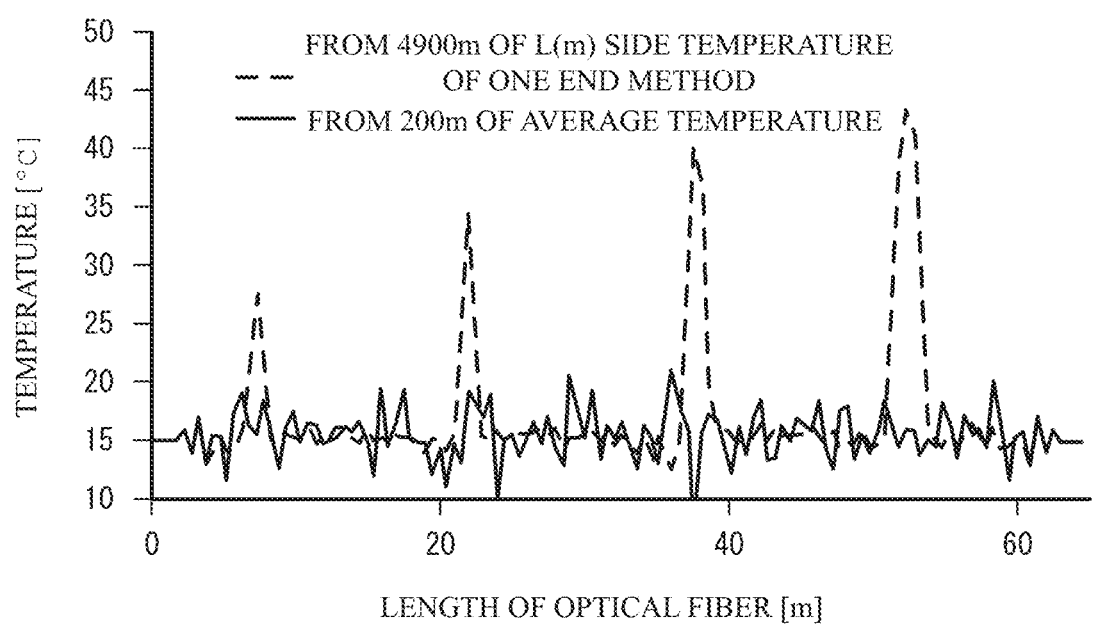
FIG. 14 illustrates an overlapped view of temperature distribution of a section that is extracted from FIG. 11, is on an L meter side of which noise is fewer and is dipped in hot water, and a terrace temperature range that is extracted from FIG. 12 and is near 200 meters.

A band pass filter that cuts off an unnecessary lower signal band, an unnecessary higher signal band (and an unnecessary middle band) or an adaptive filter that extracts an effective signal band on the basis of a designed noise model may be applied as post processes for noise reduction. FIG. 14 illustrates an overlapped view of temperature distribution of a section that is extracted from FIG. 11, is on the L meter side of which noise is fewer and is dipped in the hot water, and a terrace temperature range that is extracted from FIG. 12 and is near 200 meters. A fluctuation of the temperature of the terrace temperature range is caused by the noise.

Figure 15:
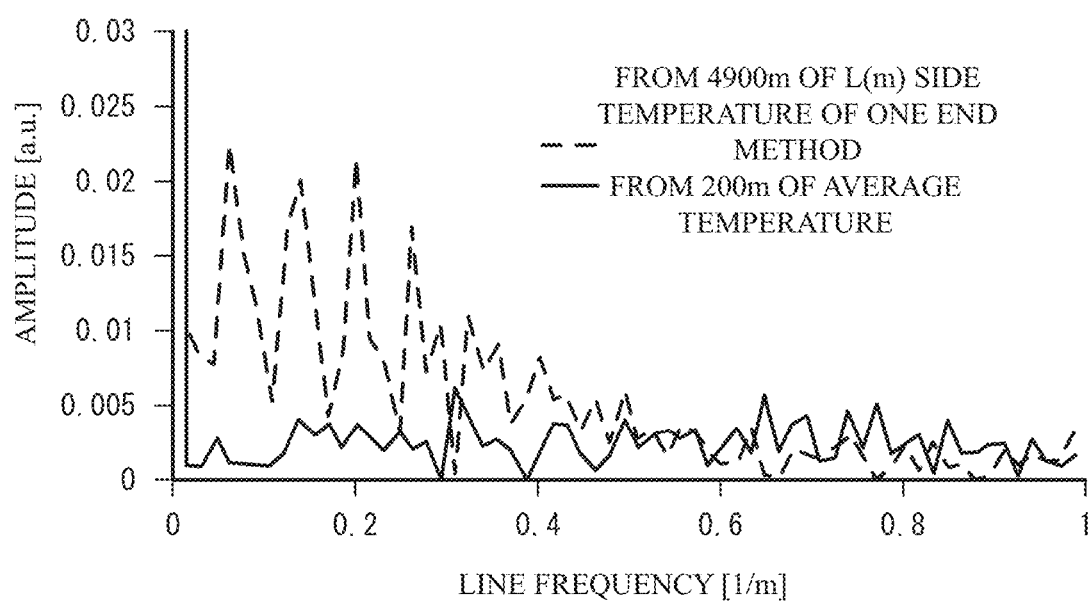
FIG. 15 illustrates a power spectrum of two wave forms.

In these data, both sides of a signal are attenuated in order to minimize an influence of aliasing at an FFT (Fast Fourier Transform). The wave form is non-linear because a sampling interval is approximately 50 cm. FIG. 15 illustrates a power spectrum of these two wave forms. As illustrated in FIG. 15, a band of a noise is overlapped with a band of a signal component. That is, a signal component attenuates with suppression of a noise in any filter processes. It is possible to preferably reduce the noise when the temperature of the hot water and the dipped length are known. However, a pattern of temperature distribution given to the optical fiber is not determined in advance. When the measurement of the double end method is performed in the temperature measurement by the detection of the back Raman scattering light, there is a problem that measurement accuracy of the end closer to the light source than near the center is degraded and a problem that a signal component itself attenuates even if a filter process is performed in order to suppress the measurement accuracy degradation.

Figure 16:
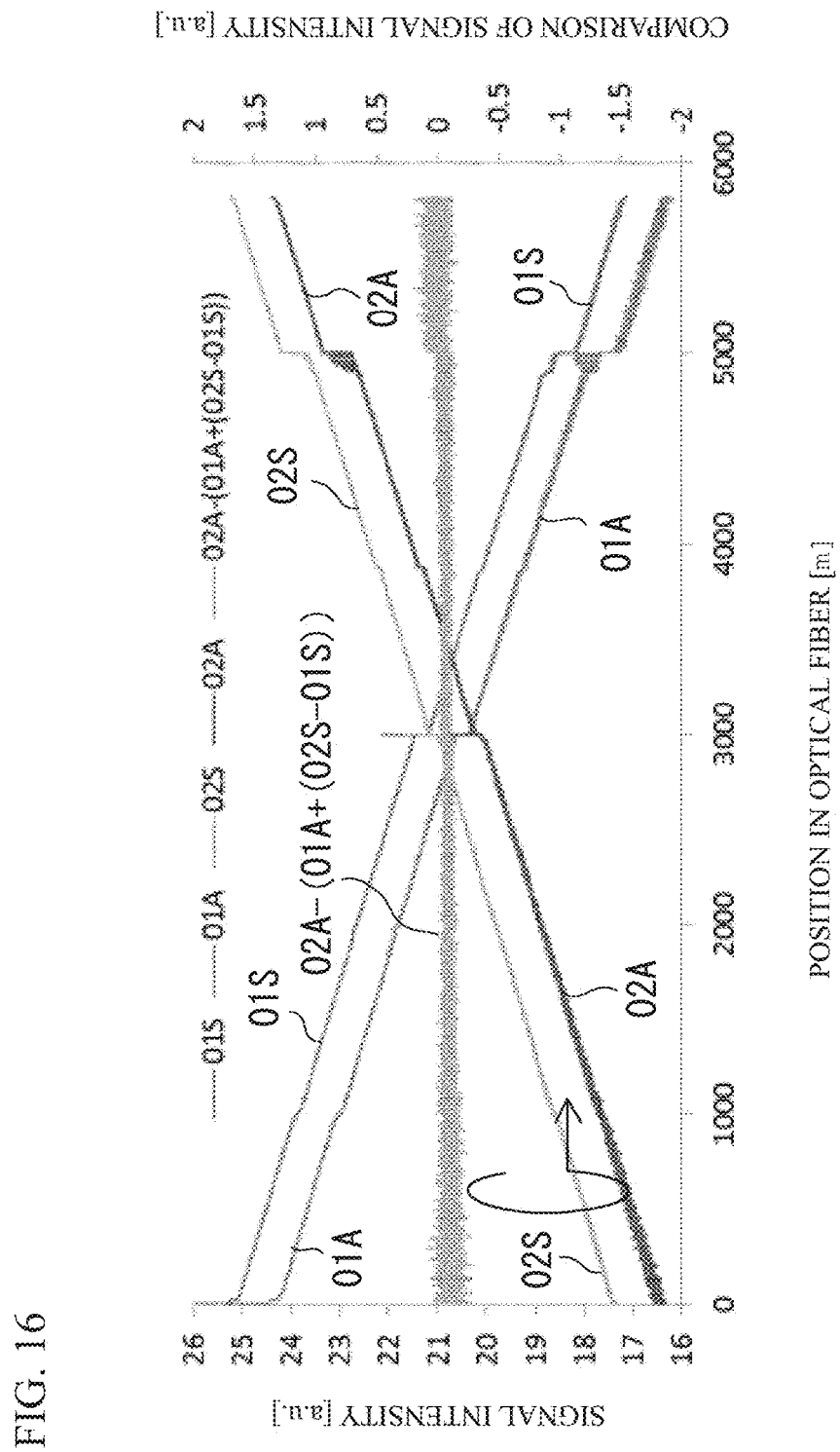
FIG. 16 illustrates a Stokes component and an anti-Stokes component that are original signals for calculating temperature distribution illustrated in FIG. 9A to FIG. 9C.

FIG. 16 illustrates the Stokes component and the anti-Stokes component that are original signals for calculating the temperature distribution illustrated in FIG. 9A to FIG. 9C. FIG. 16 illustrates the Stokes component "01S" and the anti-Stokes component "01A" of the case where the optical pulse is input into the first end, and the Stokes component "02S" and the anti-Stokes component "02A" of the case where the optical pulse is input into the second end. Moreover, a second axis indicates the following formula (4).

$$02A-(01A+(02S-01S)) \qquad (4)$$

In FIG. 16, it seems that a difference between 01A and 02A is approximately equal to a difference between 01S and 02S. And it seems that a difference between 01S and 01A is approximately equal to a difference between 02S and 02A. And so, the above-mentioned formula (4) is shown graphically in order to actually confirm whether this is correct. In FIG. 16, a noise is applied to the above-mentioned formula (4) in a measurement section. However, the above-mentioned formula (4) is approximately kept at zero.

Figure 17A:
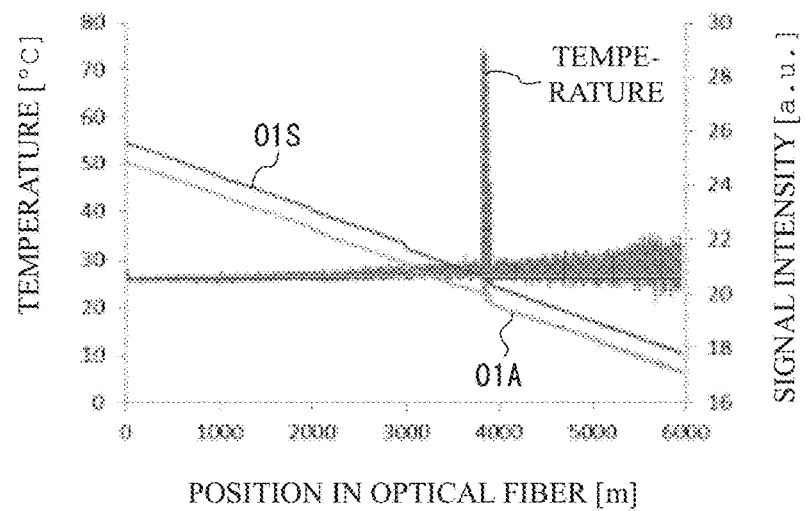
FIG. 17A to FIG. 17C illustrate another data of a case where a section different from FIG. 16 is dipped in hot water and an optical pulse is input into a first end.
Figure 17B:
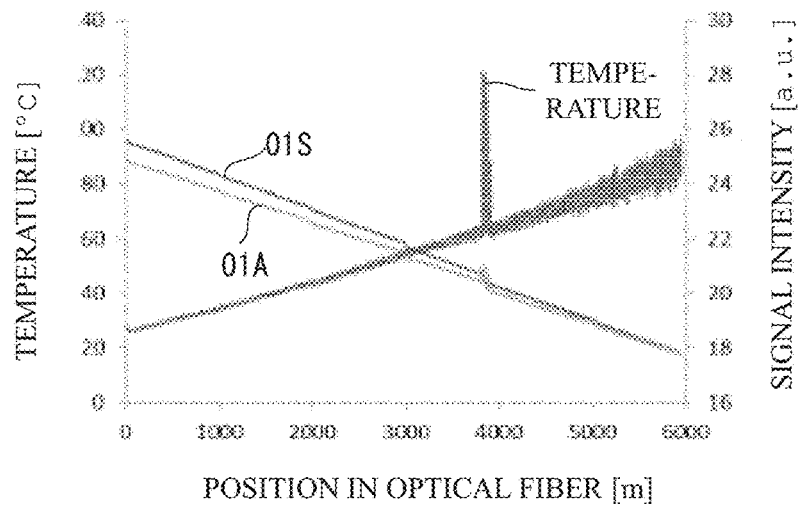
Figure 17C:
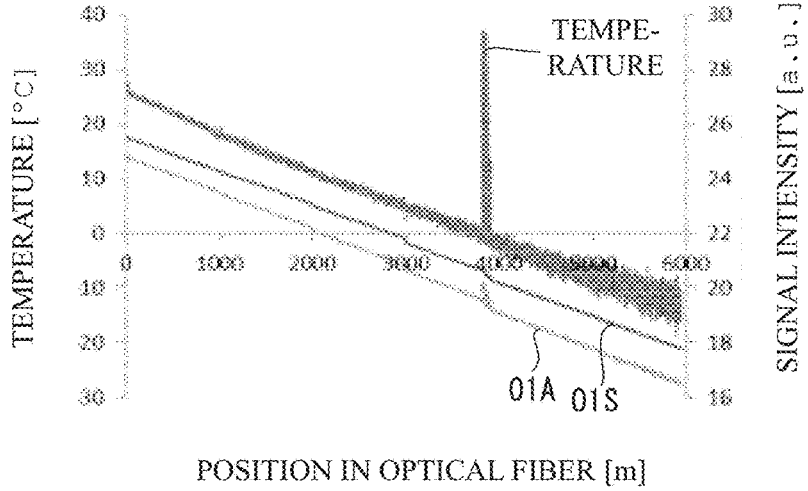

A description will be given of this phenomenon with use of FIG. 17A to FIG. 17C. FIG. 17A to FIG. 17C illustrate another data of a case where a section different from FIG. 16 is dipped in the hot water and the optical pulse is input into the first end (0 to L). In FIG. 17A, appropriate temperature distribution is achieved. On the other hand, in FIG. 17B and FIG. 17C, the temperature continues increasing or decreasing as the position gets closer to a distant end. An attenuation amount of the anti-Stokes component in the longitudinal direction is smaller in FIG. 17B than in FIG. 17A. The attenuation amount is large in FIG. 17C. Output temperature distribution in the single end method ought to be approximately the same output temperature distribution in the double end method, when the noise component is removed. Therefore, correction of the loss of the anti-Stokes component is adjusted so that the distribution FIG. 17A is achieved. In this case, the attenuation amount of the Stokes component is approximately equal to that of the anti-Stokes component in the longitudinal direction.

FIG. 17A to FIG. 17C are the cases where the optical pulse is input into the first end (0 to L). The same manner is applied to the case where the optical pulse is input into the second end (L to 0). Therefore, it seems probable that the above-mentioned formula (4) is approximately kept at zero in FIG. 16, because a total attenuation amount from an input end of zero (m) to an output end of L (m) is equal to another total attenuation amount from an input end of L (M) to an output end of zero (m).

Figure 18A:
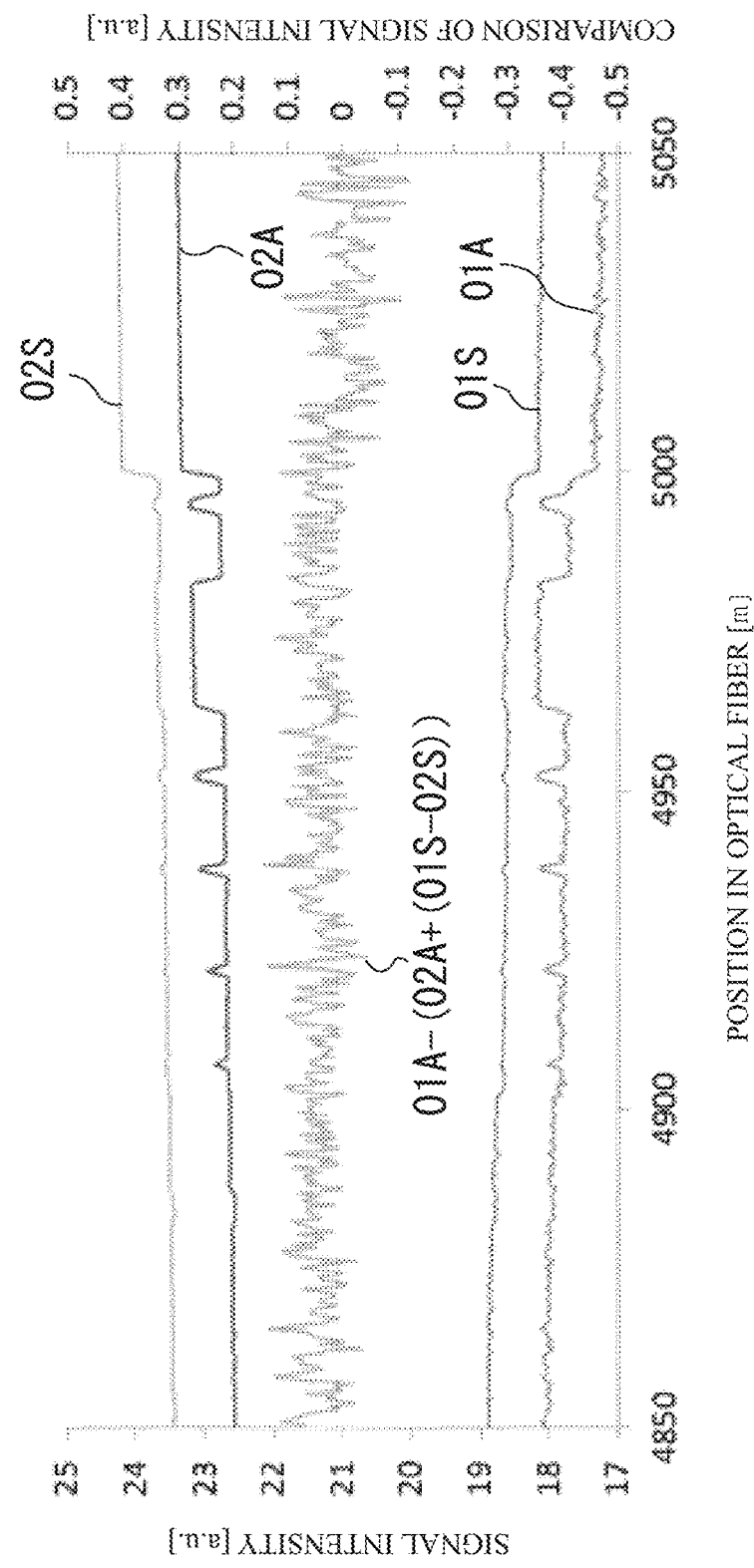
FIG. 18A illustrates an enlarged view of 4800 meters to 5100 meters of FIG. 16.
Figure 18B:
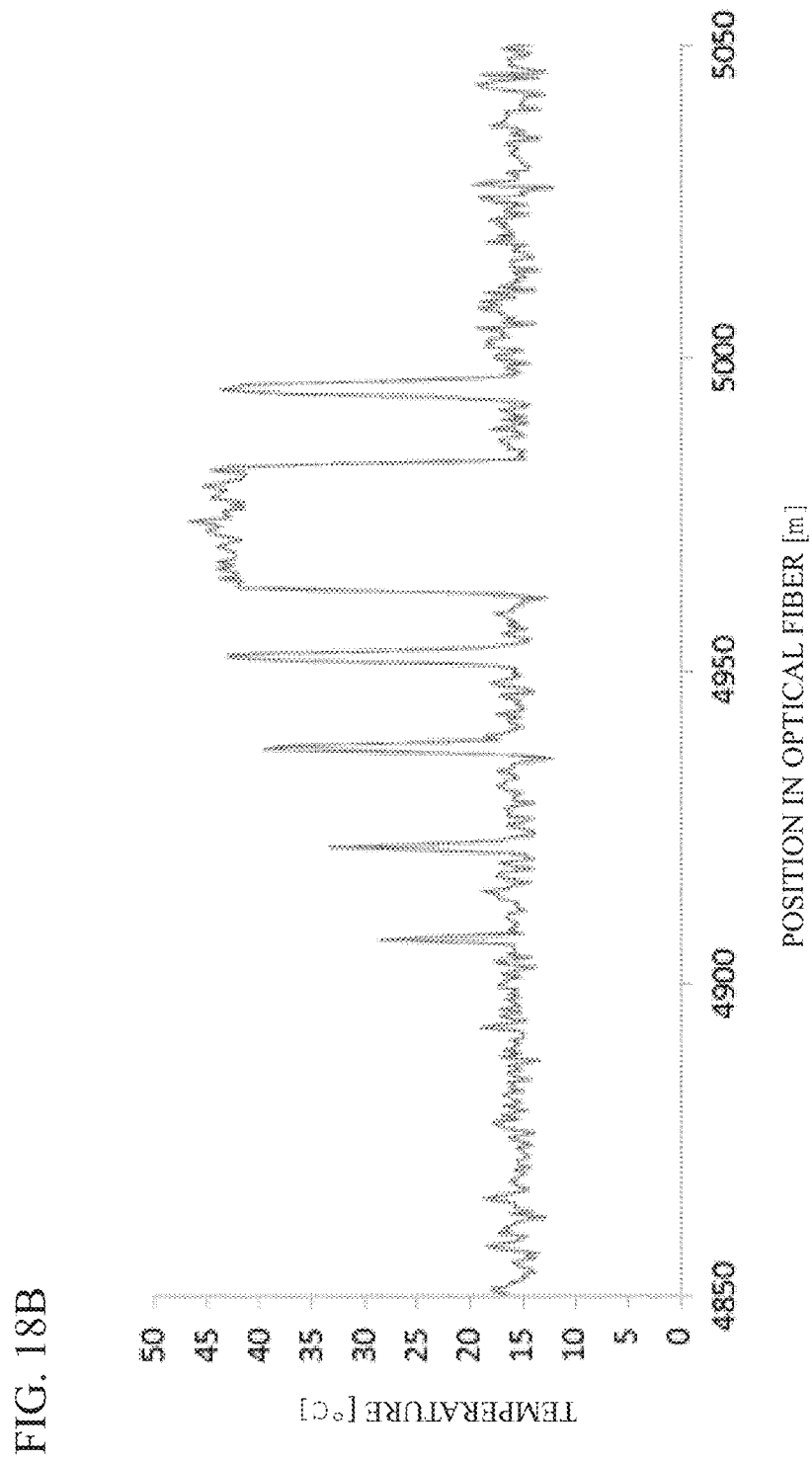
FIG. 18B illustrates an enlarged view of 4800 meters to 5100 meters of FIG. 16.

FIG. 18A and FIG. 18B illustrate an enlarged view of 4800 meters to 5100 meters of FIG. 16. FIG. 18B illustrates a measured temperature obtained with use of the following formula (5) that is different from FIG. 16. This is because, in approximately 6000 (m) of the optical fiber length, a signal intensity is reduced and the noise gets larger in the sections of FIG. 18A and FIG. 18B in the case where the optical pulse is input into the first end, and 01A of which the noise is larger in the two signals having a large noise is used as an object.

$$01A-(02A+(01S-02S)) \qquad (5)$$

From FIG. 18A and FIG. 18B, it seems that the formula (5) transits with a constant variability regardless of the influence of the temperature changing. Therefore, it is possible to estimate 01A to some extent with use of the other three components in addition to the estimations from FIG. 17A to FIG. 17C.

Figure 19:
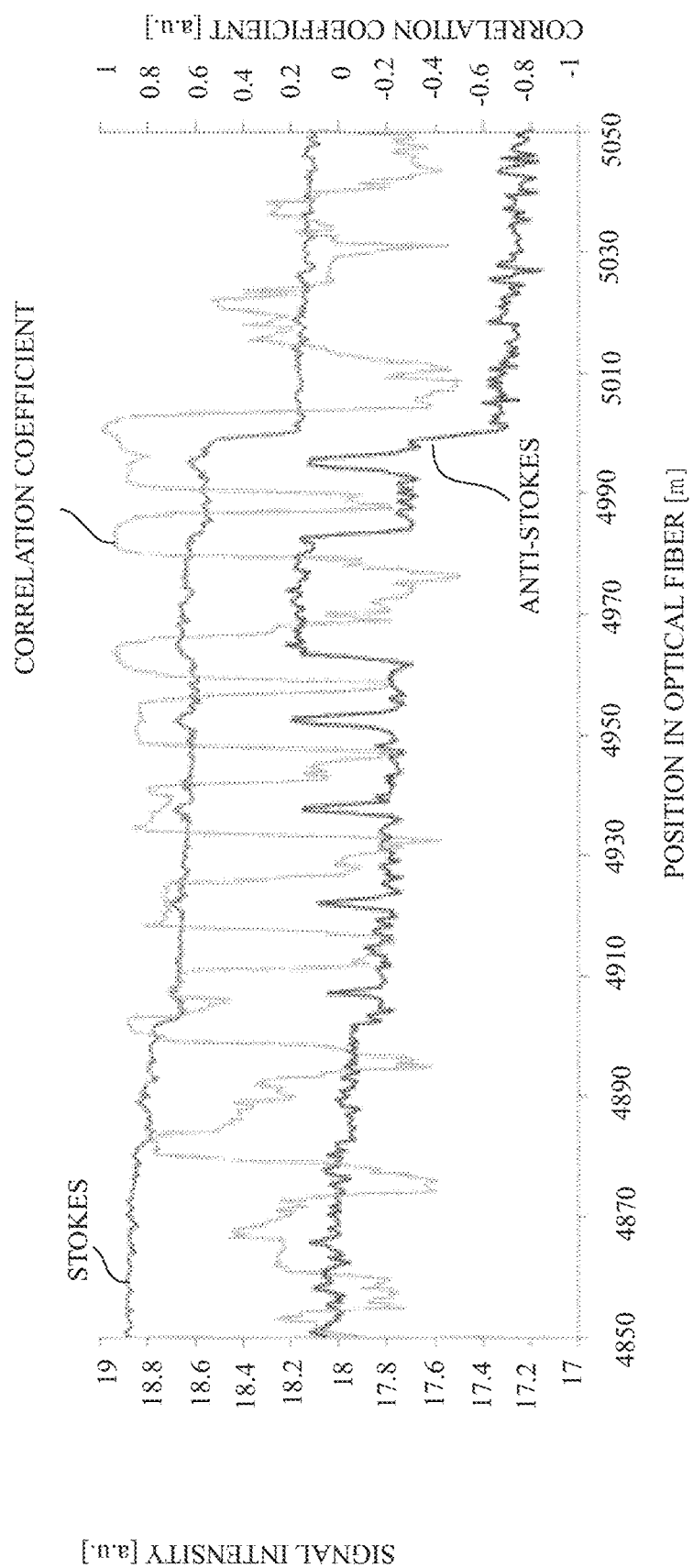
FIG. 19 illustrates a value of Pearson's product-moment correlation coefficient.

And so, a description will be given of the case where the estimation is performed and how to estimate. FIG. 19 illustrates a value of Pearson's product-moment correlation coefficient within ±2 m of which a center is a currently focused position, with respect to the Stokes component (01S of FIG. 18A) and the anti-Stokes component (01A of FIG. 18A) in the case where the optical pulse is input into the first end (0 to L). In FIG. 19, it is thought that a significant temperature changing occurs when the correlation is high in at least one of the pairs of the three signals of 01S, 02A and 02S, when 01A is a standard. That is, when the correlation is low, it is thought that the temperature changing does not occur or the temperature gradually changes. Therefore, there is little difference in output, even if the estimation with use of the three components is performed.

When the correlation is low and 01A is an object for replacing near 6000 meters (the second end) that is a distant end in the case where the optical pulse is input into 0 meter (the first end), the component of which the noise is the second largest is 01S in FIG. 18A. As mentioned above, the temperature changing is that the Stokes component and the anti-Stoked component change in synchronized with each other in the longitudinal direction of the optical fiber 30. That is, when the synchronization range is limited, it is thought that the temperature of the other region does not change with respect to the position of the fiber that is next to on the light source side or an inclination only gradually changes.

And so, it is possible to focus on the minimum heated length described on the basis of FIG. 6 to FIG. 8. It may be considered that the temperature measurement by the detection of the back Raman scattering light indicates approximately the same minimum heated length response in a given section. When a part of the optical fiber of the minimum heated length is heated more than the region in which the temperature is kept constant, a wave form that is approximately the same as the impulse response of FIG. 6 is achieved. As mentioned above, it is preferable to focus on a range of which a width is equal to or more than a zero order component width at which a gradient is reversed and is equal to or less than a primary component width at which amplitude is approximately attenuated to zero, as a range (interference range) having an influence on circumferences.

And so, with respect to 01S, a maximum average range is "a range of which a width is equal to or more than a zero order component width and is equal to or less than a primary component width of which amplitude attenuates to approximately zero", and the number of average element (average range) according to a largeness of a correlation is determined. And, a noise is reduced by replacing the number of average element with a value that is averaged around a currently focused position according to the number of average element. When the optical pulse is input into a zero meter side (first end), L meter (second end) and around is a distant end. And so, it is thought to determine whether replacing is performed with respect to 01A. And, it is thought to process 01S or use 02S and 02A at the time. However, when the optical pulse is input into an L meter side (second end), zero meter (first end) or around is a distant end. Therefore, it is thought that 02A is used as a reference.

Figure 20:
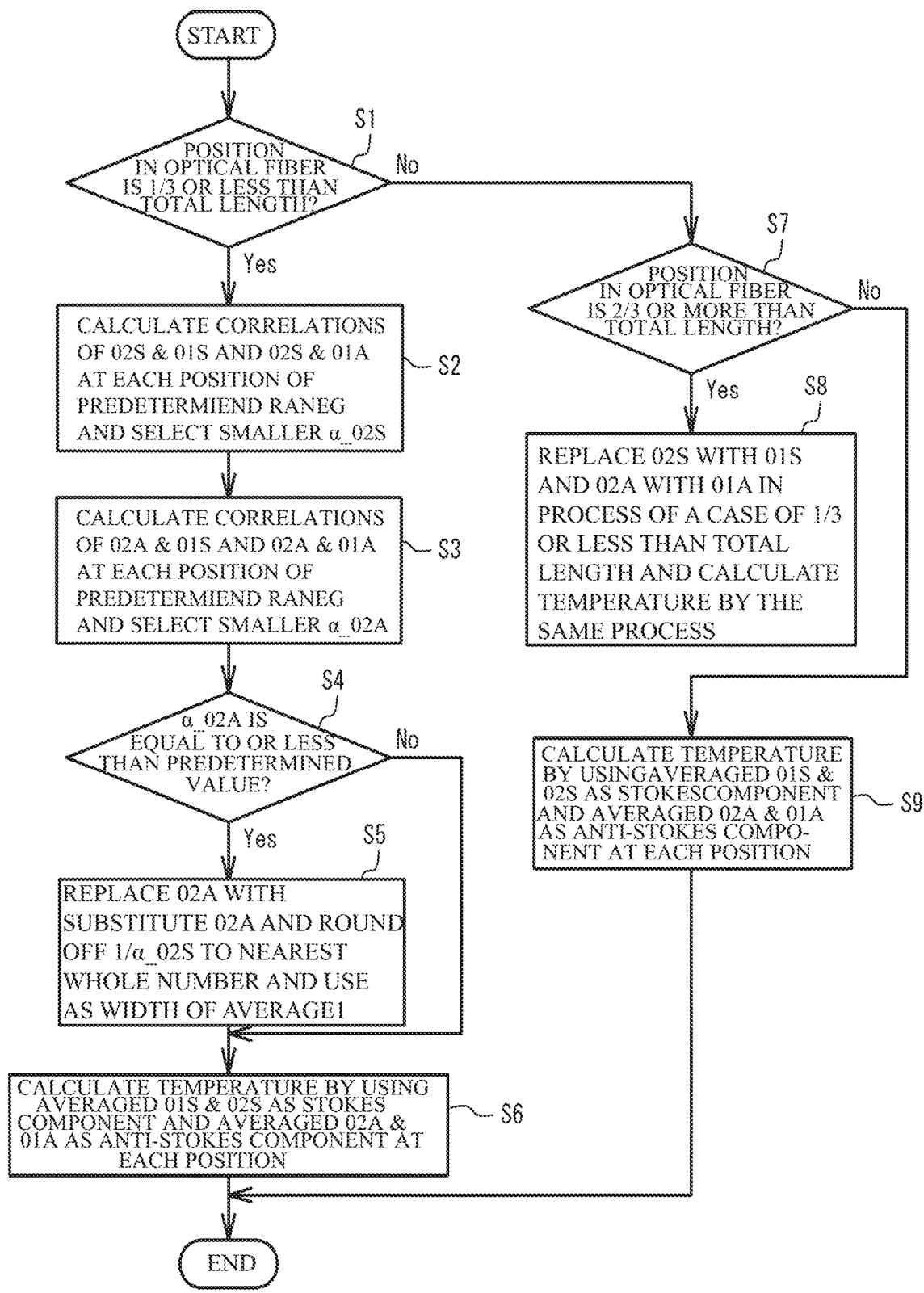
FIG. 20 illustrates a flowchart executed when a corrector corrects a temperature measured by a temperature measurer.

FIG. 20 illustrates a flowchart executed when the temperature measurement device 100 measures a temperature. As an example, on the basis of measurement accuracy distribution in a longitudinal direction of the optical fiber 30 in the double end method before shipping or measurement accuracy distribution in a longitudinal direction of the optical fiber 30 in the double end method of a representative device, the optical fiber 30 is equally divided into a first section, a center section and a third section. In the first section, the measurement accuracy near 0 meter (first end) is low. The second section is a center section. In the third section, the measurement accuracy near L meters (second end) is low. The temperature measurement device 100 executes the flowchart of FIG. 20 with respect to the three sections.

First, the corrector 23 determines whether a currently focused section of the optical fiber is the first section that is equal to or less than ⅓ of a total length of the optical fiber 30 (Step S1). When it is determined as "Yes" in Step S1, the corrector 23 calculates a largeness of the correlation of a predetermined range (designated range) of which a width is equal to or more than a zero order component width of the response wave form of the minimum heated length and is equal to or less than a primary component width of the response wave form of the minimum heated length, with respect each sample point. The sample point is an object of which a temperature is to be measured, in the longitudinal direction of the optical fiber 30. First, the corrector 23 calculates a correlation coefficient of 02S and 01S and a correlation coefficient of 02S and 01A, with respect to each sample point, and memories smaller one of the correlation coefficients, as α_02S (Step S2). Next, the corrector 23 calculates a correlation coefficient of 02A and 01S and a correlation coefficient of 02A and 01A, with respect to each sample point, and memories smaller one of the correlation coefficients, as α_02A (Step S3).

There are many methods for determining the correlation. For example, it is possible to use Pearson's product-moment correlation coefficient. The Pearson's product-moment correlation coefficient of 02A and 01S is expressed by the following formula (6).

Correlation coefficient α=(covariance of 02A of which a range is the same as that of 01S of a designated range)/(standard deviation of 01S of the same range)/(standard deviation of 02A of the same range) (6)

The Pearson's product-moment correlation coefficient of which a center is a sample point k of the optical fiber 30 is α[k]. An array of 01S is 01S[k]. An array of 02A is 02A[k]. The number of the samples of the designated range is n. An average of 01S[k] of the designated range is 01Save. An average of 02A[k] of the designated range is 02Aave. The above-mentioned formula (6) can be expressed by the following formula (7).

[Number 1]

$$\alpha[k] = \frac{n^{-1}\sum_{k=0}^{n}(01S[k]-01Save)(02A[k]-02Aave)}{\sqrt{n^{-1}\sum_{k=0}^{n}(01S[k]-01Save)^2}\sqrt{n^{-1}\sum_{k=0}^{n}(02A[k]-02Aave)^2}} \quad (7)$$

As another example, when a modified Spearman's rank correlation coefficient is used, the n numbers of 01S and 02A in the designated range (n in the above-mentioned formula (7)) are ranked and the Pearson's product-moment correlation coefficient is used for the ranking. When there are two or more of the same rank, a compensation formula is used. However, generally, there are few cases where there are two or more of the same rank, with respect to the Stokes component and the anti-Stokes component. Therefore, the previously appearing one may be treated as a higher rank.

Figure 21:
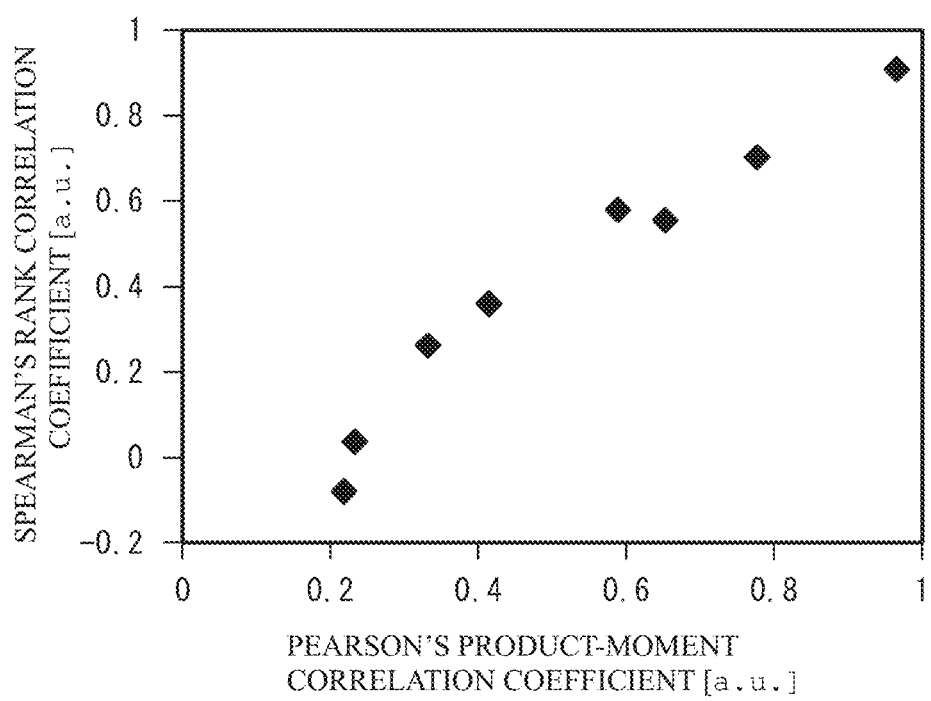
FIG. 21 illustrates a comparison between a Pearson's product-moment correlation coefficient and a Spearman's rank correlation coefficient with respect to data of FIG. 16.

For example, ±3.6 m is set in the section indicated by the impulse response of FIG. 6, as a range satisfying the above condition. FIG. 21 illustrates a comparison between the Pearson's product-moment correlation coefficient and the Spearman's rank correlation coefficient with respect to the data of FIG. 16. Generally, the Pearson's product-moment correlation coefficient of 1 or −1 indicates a complete correlation. The Pearson's product-moment correlation coefficient of 0.4 or more and less than 0.7 in an absolute value indicates a high correlation. The Pearson's product-moment correlation coefficient of 0.2 or more and less than 0.4 in an absolute value indicates a low correlation. The Pearson's product-moment correlation coefficient of less than 0.2 in an absolute value indicates no correlation. However, although an inclination of Spearman's is changed greatly than that of Person's, in the range of less than 0.2 indicating no correlation, an approximate ratio of 1:1 is achieved in the range of 0.3 or more indicating the low correlation and the same result is achieved with respect to FIG. 16. When normalized, another correlation coefficient may be generated. Of course, another correlation coefficient may be used.

Next, the corrector 23 determines whether the correlation coefficient α_02A is equal to or less than a predetermined value (for example, 0.2 or less) at each sample point (Step S4). When it is determined as "Yes" in Step S4, the corrector 23 replaces 02A by a substitute 02A at the sample point where it is determined as "Yes" in Step S4 (Step S5).

It is possible to express the substitute 02A by the following formula (8).

Substitute 02A=01A+(AVERAGE1(02S)−01S)+(AVERAGE2(02A)−AVERAGED2(01A))−(AVERAGE2(02S)−AVERAGE2(01S))   (8)

The AVERAGE1 is an average of which a section is variable according to a signal quality of a currently focused sample point. The AVERAGE2 is an average of a fixed width of which a center is the currently focused sample point. The corrector 23 determines an average range of the AVERAGE1 in accordance with a smallness degree of the correlation coefficient between 02S and 01S and a smallness degree of the correlation coefficient between 02S and 01A. For example, an integer number of samples obtained by rounding off to the nearest whole number of 1/α_02S may be the average range of the AVERAGE1. In this case, the smaller the currently focused correlation coefficient is, the larger the average range of the AVERAGE1 is. However, it is preferable that an upper limit of the average range of the AVERAGE1 is equal to or more than a zero order component width, or equal to or less than a first order component width in which amplitude is attenuated to approximately zero, as mentioned above.

The substitute 02A is obtained by using 02S of the formula "02A−(01A+(02S−01S))" explained for the second axis of FIG. 16 as an AVERAGE1(02S), using the second member of the formula, and subtracting AVERAGE2(02A)−(AVERAGE2(01A)−(AVERAGE2(02S)−AVERAGE2 (01S))) that is a slight offset value between the first member and the second member. The average range of the AVERAGE2 is an average range larger than the average range of the AVERAGE1 of which a center is currently focused position.

After execution of Step S5 or when it is determined as "No" in Step S4, the temperature measurer 22 uses the average value of 01S and 02S as an average Stokes component, uses the average value of 01A and 02S as the anti-Stokes component, and measures the temperature with use of the above-mentioned formula (2) (Step S6). That is, when it is determined as "Yes" in Step S4, the temperature is calculated after 02A is replaced by the substitute 02A. When it is determined as "No" in Step S4, the temperature is calculated without replacing 02A by the substitute 02A.

With the processes, values with little noise and high reliability are relatively weighed, and noise can be removed. Although smaller one of the values of Step S2 and Step S3 is used, larger one may be used. Alternatively, an average of the values of Step S2 and Step S3 may be used. When the smaller one is used, data except for a part considered as temperature changing is equalized. When the larger one is used, even slight changing data buried in a noise is not removed as possible.

When it is determined as "No" in Step S1, the corrector 23 determines whether a currently focused section of the optical fiber is the third section that is equal to or more than ⅔ of the total length of the optical fiber 30 (Step S7). In the third section, 02S corresponds to 01S, and 02A corresponds to 01A. And so, when it is determined as "Yes" in Step S7, the corrector 23 replaces 02S with 01S, replaces 01S with 02S, replaces 02A with 01A and replaces 01A with 02A. And the corrector 23 performs the same process as Step S2 to Step S6 (Step S8). Therefore, when the correlation coefficient α_01A is a predetermined value (for example, 0.2 or less), 01A is replaced with the substitute 01A of the following formula (9).

Substitute 01A=02A−(02S−AVERAGE1(01S))−(AVERAGE2(02A)−AVERAGE2(01A))+(AVERAGE2(02S)−AVERAGE2(01S))   (9)

The first member and the second member of the right side of the formula use the above-mentioned three signals. The third member is a correction member of a slightly occurred offset. A slight offset member does not completely compensate for the attenuation amount of the anti-Stokes component with respect to the Stokes component of the case of the single end method described on the basis of FIG. 16 and FIG. 17A to FIG. 17C. The same manner is applied to the case where the optical pulse is input into the opposite L meter side (second end). And so, the offset component is removed with use of the wide average range AVERAGE2.

In concrete, the offset component is "Δ01A≅01A−(02A+(01S−02S)≅−(AVERAGE2(02A)−AVERAGE2(01A))+(AVERAGE2(02S)−AVERAGE2(01S))". Therefore, the substitute 01A is obtained by subtracting the component. The same manner is applied to the substitute 02A in the above-mentioned first section. The substitute 01A is expressed by the following formula (10). The formula (10) is equal to the formula (9).

Substitute 01A=02A+(AVERAGE1(01S)−02S)+(AVERAGE2(02S)−AVERAGE2(01S))−(AVERAGE2(02A)−AVERAGE2(01A))   (10).

When it is determined as "No" in Step S7, the temperature measurer 22 uses the average of 01S and 02S as an average Stokes component, uses the average of 01A and 02A as the anti-Stokes component, and measures the temperature with use of the above-mentioned formula (2) (Step S9). In FIG. 20, a reciprocal number of the largeness of the correlation coefficient is an index of the average range. However, it is not always necessary to use the reciprocal number. The larger the correlation coefficient is, the narrower the average range relatively is. And, the smaller the correlation coefficient is, the wider the average range relatively is. Moreover, the average range of the AVERAGE1 may be a fixed section regardless of the signal quality of the sample point. In the case, the process for determining whether 02A is replaced by the substitute 02A with use of α_02A in Step S4 and the process for determining whether 01A is replaced with the substitute 01A with use of α_01A in Step S8 are as the same as those of the case where the AVERAGE1 is not fixed. And, the average range of the AVERAGE2 is larger than the average range of the AVERAGE1.

Figure 22:
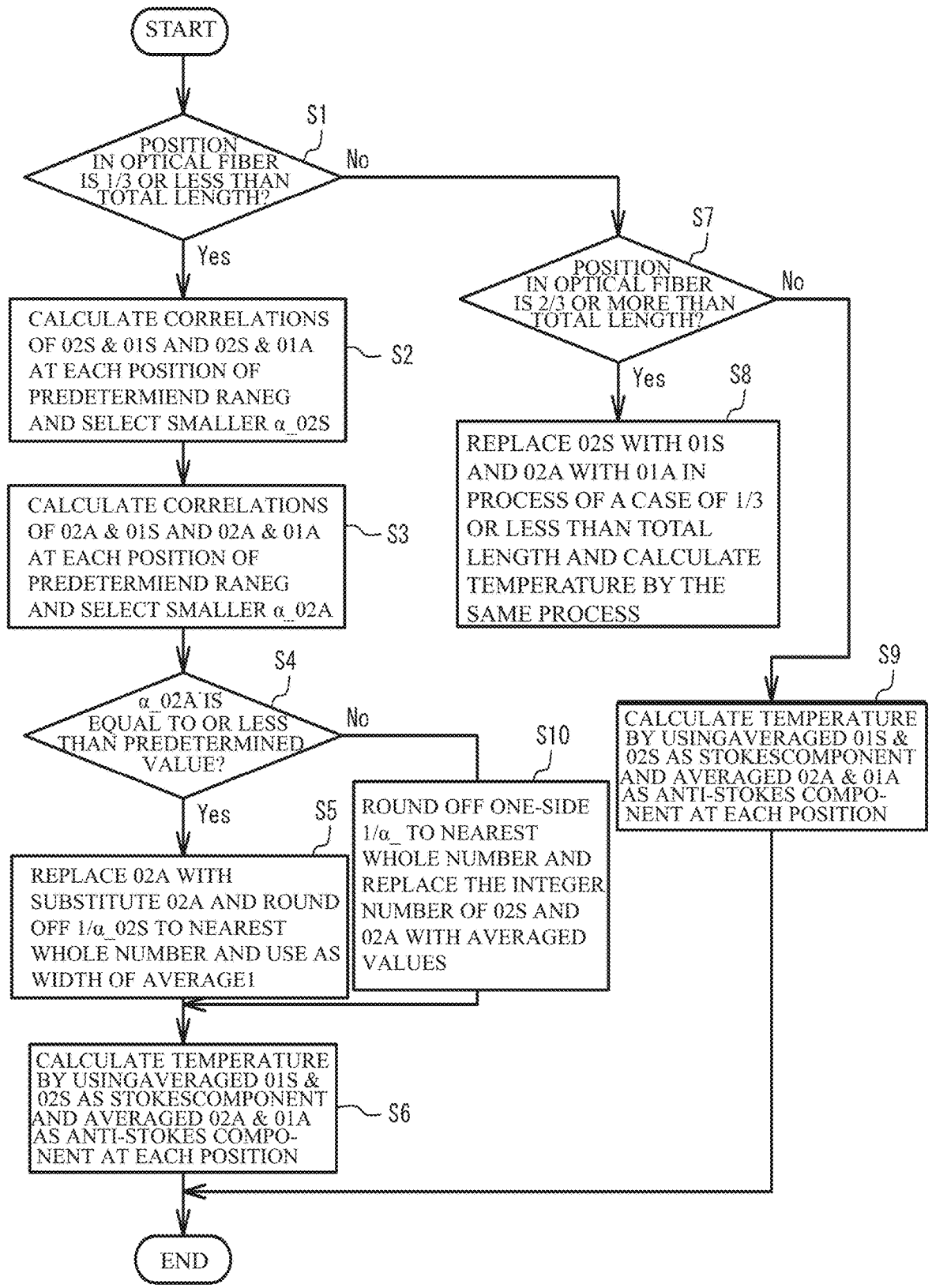
FIG. 22 illustrates another flowchart executed when a corrector corrects a temperature measured by a temperature measurer.

FIG. 22 illustrates a flowchart executed when the temperature measurement device 100 measures the temperature. FIG. 22 is different from FIG. 20 in a point that each of the average ranges of 02S and 02A corresponds to the integer number of the samples that are obtained by rounding off 1/α_02S to the nearest whole number with respect to one side and is replaced with the averaged value when it is determined as "No" in Step S4 (Step S10). After execution of Step S10, Step S6 is executed. Thus, when the correlation between the anti-Stokes component and another component of the distant end is equal to or more than a predetermined value, both the anti-Stokes component and the Stokes component of the distant end are replaced with a value that is averaged in the average range according to the largeness of the correlation coefficient. Thus, it is possible to reduce not only the anti-Stokes component that fluctuates as a noise of the distant end but also the noise of the Stokes component.

Figure 23:
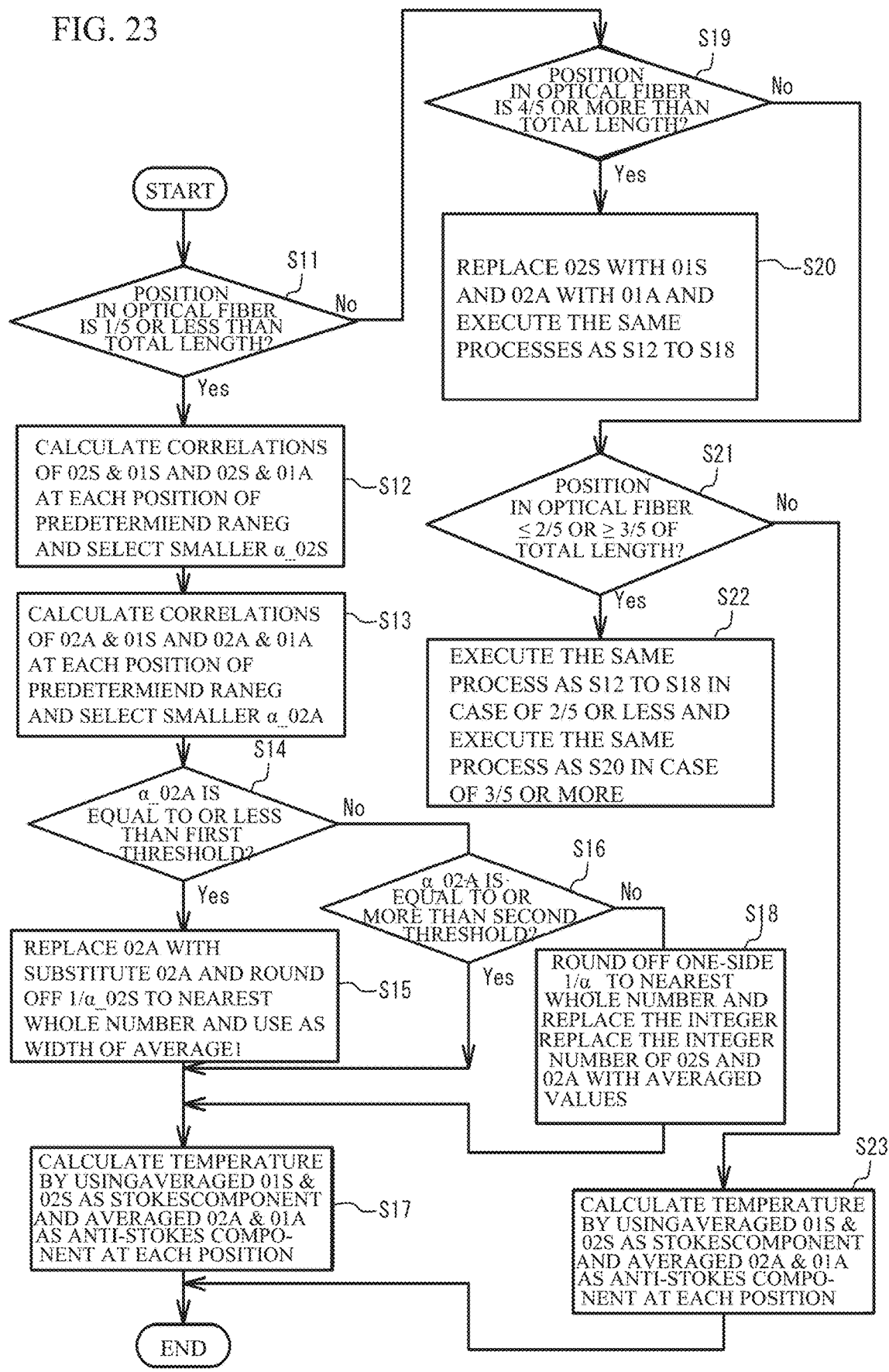
FIG. 23 illustrates another flowchart executed when a corrector corrects a temperature measured by a temperature measurer.

FIG. 23 illustrates another flowchart executed when the temperature measurement device 100 measures the temperature. A description will be given of a difference between FIG. 23 and FIG. 22. First, on the basis of the measurement accuracy distribution in the longitudinal direction of the optical fiber 30, the optical fiber 30 is equally divided into a first section near 0 meter (first end) of which measurement accuracy is low, a center third section, a fifth section near L meter (second end) of which measurement accuracy is low, a second section between the first section and the third section and a fourth section between the third section and the fifth section. The corrector 23 executes the flowchart of FIG. 23 with respect to the five sections.

The corrector 23 determines whether a currently focused section of the optical fiber 30 is the first section that is equal to or less than ⅕ of the total length of the optical fiber 30 (Step S11). When it is determined as "Yes" in Step S11, the corrector 23 executes Step S12 to Step S14 that are the same as Step S2 to Step S4. The predetermined value used in Step S14 is referred to as a first threshold. When it is determined as "Yes" in Step S14, the corrector 23 executes Step S15 that is the same as Step S5.

When it is determined as "No" in Step S14, the corrector 23 determines whether the correlation coefficient α_02A is equal to or more than a second threshold that is larger than the first threshold used in Step S14 (for example, 0.55) (Step S16). When it is determined as "Yes" in Step S16 or after execution of Step S15, Step S17 that is the same as Step S6 is executed. When it is determined as "No" in Step S16, Step S18 that is the same as Step S10 is executed. After execution of Step S18, Step S17 is executed. Even if α_02A is equal to or more than the second threshold in S16, α_02S may be a small value. In this case, one side average range may be replaced with an average value using integer parts obtained by rounding off 1/α_02S to the nearest whole number, as well as S18.

When it is determined as "No" in Step S11, the corrector 23 determines whether the currently focused section of the optical fiber 30 is equal to or more than ⅘ of the total length of the optical fiber 30 (Step S19). When it is determined as "Yes" in Step S19, the same processes as Step S12 to Step S18 are executed after replacing 02S with 01S, 01S with 02S, 02A with 01A and 01A with 02A (Step S20).

When it is determined as "No" in Step S19, the corrector 23 determines whether the currently focused section is equal to or less than ⅖ of the total length of the optical fiber 30 or equal to or more than ⅗ of the total length of the optical fiber 30 (Step S21). When it is determined as "Yes" in Step S21 and the currently focused section is equal to or less than ⅖ of the total length of the optical fiber 30, the same processes as Step S12 to Step S18 are executed. However, a threshold with respect to the correlation coefficient and an upper limit value of averaging are different from those of Step S12 to Step S18. When it is determined as "Yes" in Step S21 and the currently focused section is equal to or more than ⅗ of the total length of the optical fiber 30, the same process as Step S20 is executed. However, a threshold with respect to the correlation coefficient and an upper limit of averaging are different from those of Step S20. It is therefore possible to perform correction with respect to the minimum heated length that changes in accordance with the section. When it is determined as "No" in Step S21, Step 23 that is the same as Step S9 is executed.

In FIG. 20, FIG. 22 and FIG. 23, the average range is equal to or less than the primary component width of the minimum heated length. This is because the probability that the crosstalk adjacent to another signal influences on the averaged signal becomes higher when the average range exceeds the primary component width of the minimum heated length. For example, when the obtained correlation coefficient is −1, it is determined that a complete correlation occurs. However, in the embodiment, the correlation is treated as a noise. The reason is as follows. When the temperature increases, the Stokes and the anti-Stokes have a convex shape toward upper side. When the temperature decreases, the Stokes and the anti-Stokes have a convex shape toward lower side. In this case, the anti-Stokes component never has the shape in which the Stokes component is reversed up and down. Only when a noise occurs or connectors of poor connection are fused or connected to each other or fibers of which a refractive index difference is large are fused or connected to each other, the anti-Stokes component may have the shape in which the Stokes component is reversed up and down, In FIG. 20, FIG. 22 and FIG. 23, the optical fiber is divided into three sections or five sections. However, the optical fiber may be divided at a center into two sections, or four sections obtained by dividing the two sections or eight sections obtained by dividing the four sections. In these cases, only the center section of which the temperature is calculated without processing 01S, 01A, 02S and 02A is removed.

In the embodiment, the double end method is used. 02A is substituted with a substitute value according to 01S, 01A and 02S, when the optical pulse is input into the second end and at least one of the correlation coefficient of 02A and 01S and the correlation coefficient of 02A and 01A is equal to or less than a threshold in a predetermined region including a sample point of a partial region on the first end side. In this case, when a large noise appears in 02A, 02A is substituted with a value according to 01S, 01A and 02S of which noise is little. It is therefore possible to reduce the noise in 02A. On the other hand, 01A is substituted with a substitute value according to 02S, 02A and 01S, when the optical pulse is input into the first end and at least one of the correlation coefficient of 01A and 02S and the correlation coefficient of 01A and 02A is equal to or less than a threshold in a predetermined region including a sample point of a partial region on the second end side. In this case, when a large noise appears in 01A, 01A is substituted with a value according to 02S, 02A and 01S of which noise is little. It is therefore possible to reduce the noise in 01A. When these corrected 02A and 01A are used, it is possible to correct the measured temperature. When the substitute 02A is calculated, it is preferable that 01S and 01A are components just before 02A with respect to switching of the optical switch 13. However, 01S and 01A may be not only the components just before 02A but also components before 02A. Alternatively, 01S and 01A may be components after 02A. When the substitute 01A is calculated, it is preferable that 02S and 02A are components just before 01A with respect to switching of the optical switch 13. However, 02S and 02A may be not only the components just before 01A but also components before 01A. Alternatively, 02S and 02A may be components after 01A. 02A is substituted, when the optical pulse is input into the second end and at least one of the correlation coefficient of 02A and 01S and the correlation coefficient of 02A and 01A is equal to or less than the threshold. In a case where the correlation coefficient of 02S and 02A is equal to or more than a predetermined value, 02A may be substituted, when at least one of the correlation coefficient of 02S and 01S and the correlation coefficient of 02S and 01A is equal to or less than a threshold or when at least one of the correlations of 02A and 01S, 02A and 01A, 02S and 01S, and 02S and 01A is equal to or less than a threshold, or when another condition is satisfied. Similarly, 01A is substituted, when the optical pulse is input into the first end and at least one of the correlation coefficient of 01A and 02S and the correlation coefficient of 01A and 02A is equal to or less than the threshold. In a case where the correlation coefficient of 01S and 01A is equal to or more than a predetermined value, 01A may be substituted, when at least one of the correlation coefficient of 01S and 02S and the correlation coefficient of 01S and 02A is equal to or less than a threshold or when at least one of the correlations of 01A and 02S, 01A and 02A, 01S and 02S, and 01S and 02A is equal to or less than a threshold, or when another condition is satisfied.

In the embodiment, an average of the Stokes component and the anti-Stokes component is calculated in the average range. However, the average may not be necessarily calculated when variability of data in the average range is suppressed. And so, another average such as an arithmetic mean considering w weight, a geometric mean or a harmonic mean may be used. An arithmetic mean considering a weight may be used when the average of 01S and 02S and the average of 01A and 02A are calculated.

Other Examples

Figure 24:
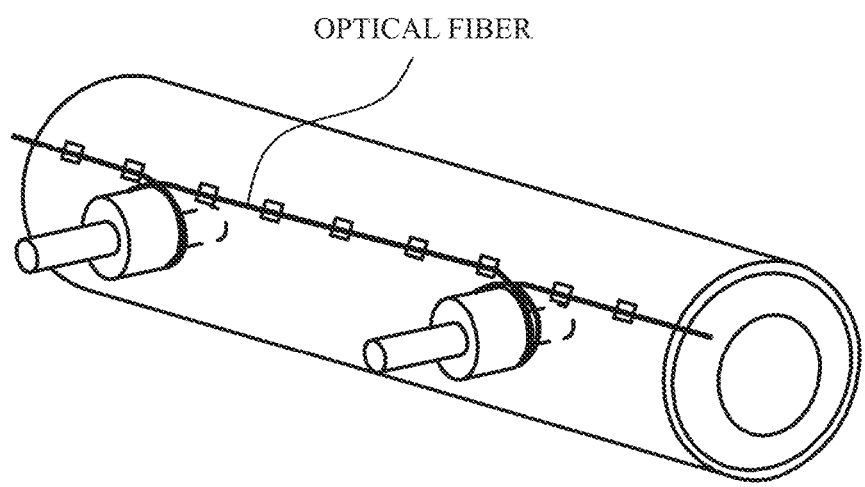
FIG. 24 illustrates another example.

The temperature measurement device 100 may be applied to various objects of which a temperature is to be measured. For example, as illustrated in FIG. 24, it is thought that an optical fiber is provided on a branch pipe of a pipe for transporting a raw material of a high temperature and a high pressure. A racking material and an outer metal board keeps a temperature of the pipe of the high temperature and the high pressure and protects the pipe. Even if a leak occurs because of corrosion of a joint of the pipe, there are many cases where the leak is not detected unless an emergency causing a fire accident occurs. And so, it is possible to precisely detect occurrence of leak at the joint early even if an outer temperature, an internal temperature or an internal pressure fluctuates, when an optical fiber is rolled around the joint and correlation relationships between changings of temperatures of positions of the optical fiber. As a method for comparing the correlations of the temperatures of positions of the optical fiber, there is a method for examining an outlier by generating a variance-covariance matrix having elements including a temperature of each position of the optical fiber and using a Mahalanobis distance or an MSD method.

Figure 25:
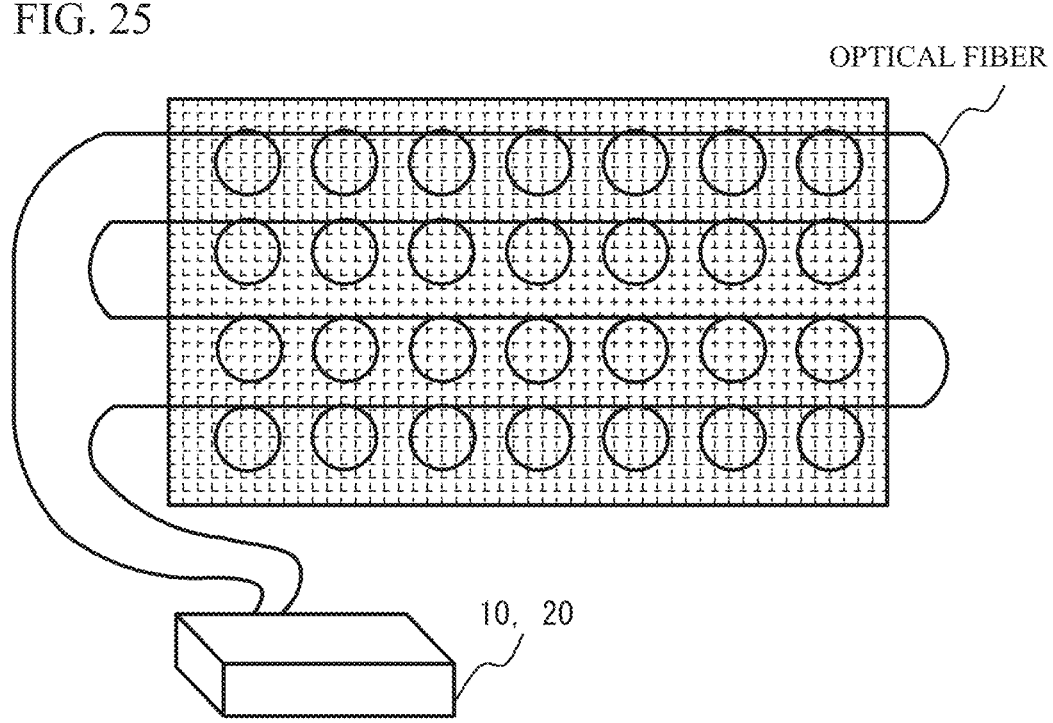
FIG. 25 illustrates another example.

FIG. 25 illustrates a single optical fiber applied to a method for measuring a temperature of a passed air with use of many rolling parts structured by the optical fiber. Each rolling part is rolled a few times around each fixed position with approximately the same diameter and is coupled with another next rolling part. It is possible to detect whether a wind passes through a sheet or a frame on which the optical fiber is provided and detect temperature distribution of the wind, when the measurement device 10 and the controller 20 in accordance with the above-mentioned embodiment are used, an average temperature of the rolling parts is calculated, and a gradation including representative temperatures of center coordinates of the rolling parts is generated. As the rolling number of each rolling part increases, the number of measurement points to be averaged increases, and a superficial measurement accuracy improved. Therefore, desirable measurement accuracy is achieved with a measurement of a short period. When the length of the optical fiber is shortened, an attenuation amount of the optical pulse is reduced. Therefore, the measurement accuracy is improved. In order to achieve desirable measurement accuracy with a shorter period, it is demanded that a temperature data itself is output with high accuracy. When the above-mentioned embodiment is applied, the demand is satisfied.

Figure 26A:
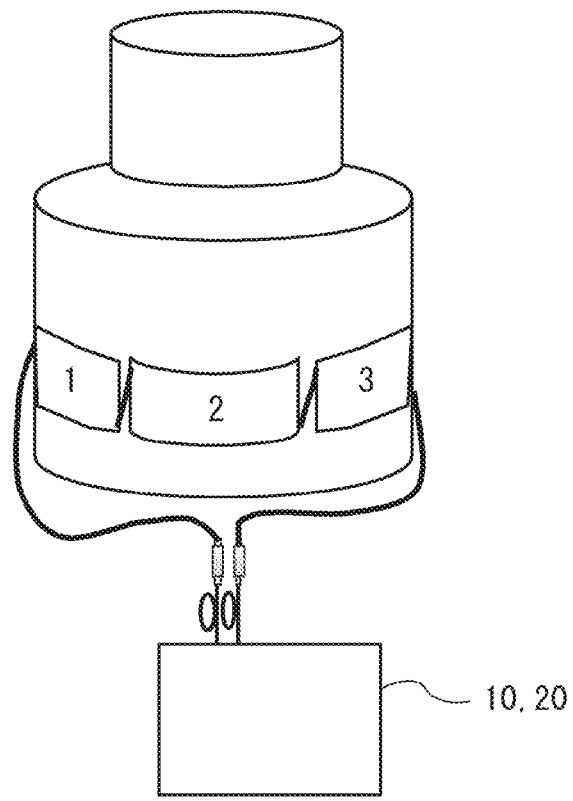
FIG. 26A and FIG. 26B illustrate another example.
Figure 26B:
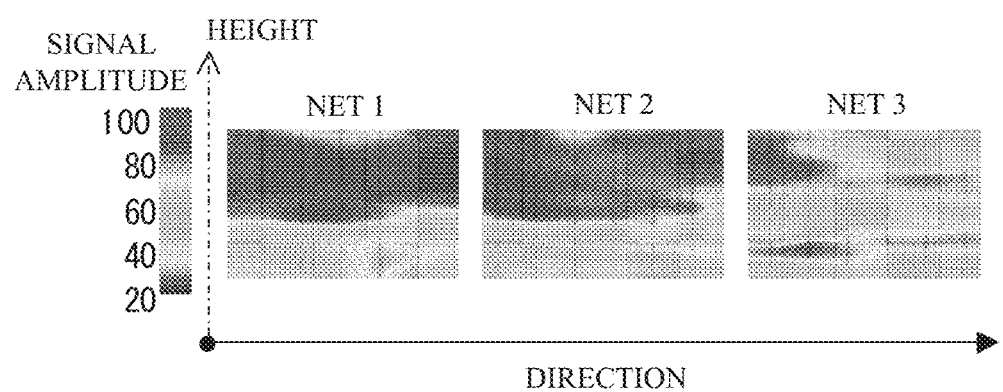

FIG. 26A and FIG. 26B illustrate an example in which fiber nets are provided on a surface of a melting furnace. In the fiber net, many rolling parts with use of a heat-resistant fiber are coupled. Each fiber net is coupled to each other. An entrance end of a distal fiber net and an exit end of another distal fiber net are coupled to the measurement device 10 and the controller 20. Thus, a measurement device of the double end method is structured. It is possible to visualize a superficial temperature condition of the melting furnace, when the relationship between the positions of the nets 1 to 3 and the temperature distribution is shown in two-dimensional gradations of FIG. 26B and the generated two-dimensional gradations are fitted on positions corresponding to directions of the nets with respect to a reference direction of the melting furnace. It is possible to measure the temperature with high accuracy when an unexpected temperature change abnormality is monitored with use of a threshold and when a precursory phenomenon of abnormality is analyzed from changing of the Mahalanobis distance or changing of a value calculated by the MSD method with use of a time course of the relative relationship between the temperature changings of the rolling parts of the nets, as well as the example of FIG. 24.

Figure 27A:
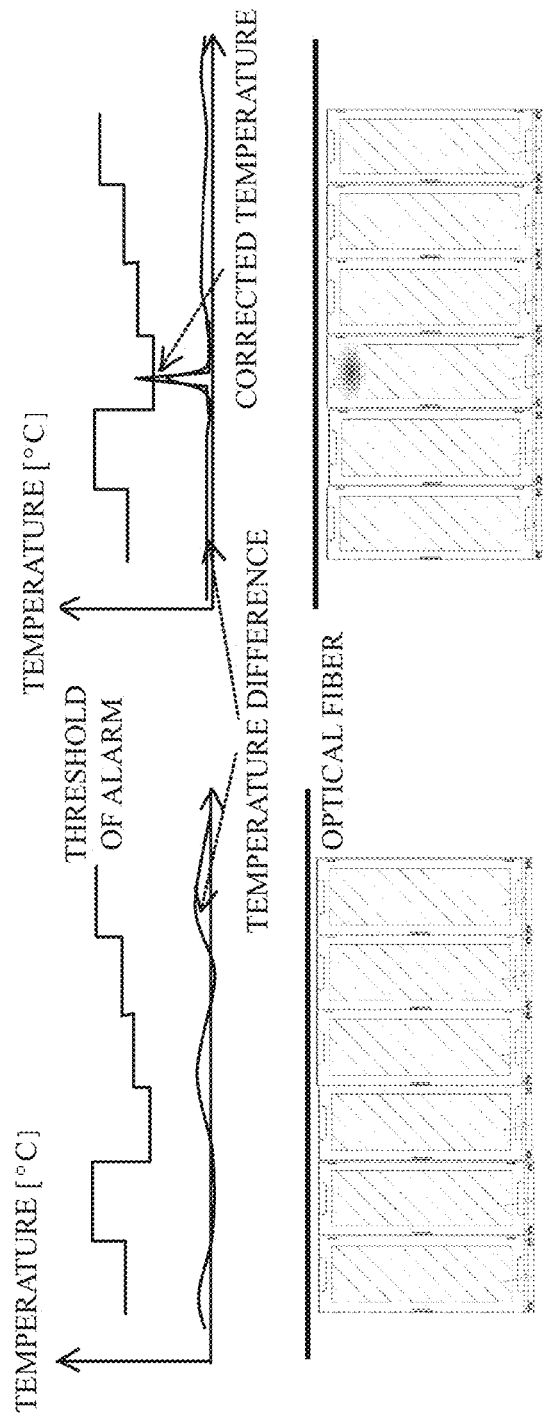
FIG. 27A and FIG. 27B illustrate another example.
Figure 27B:
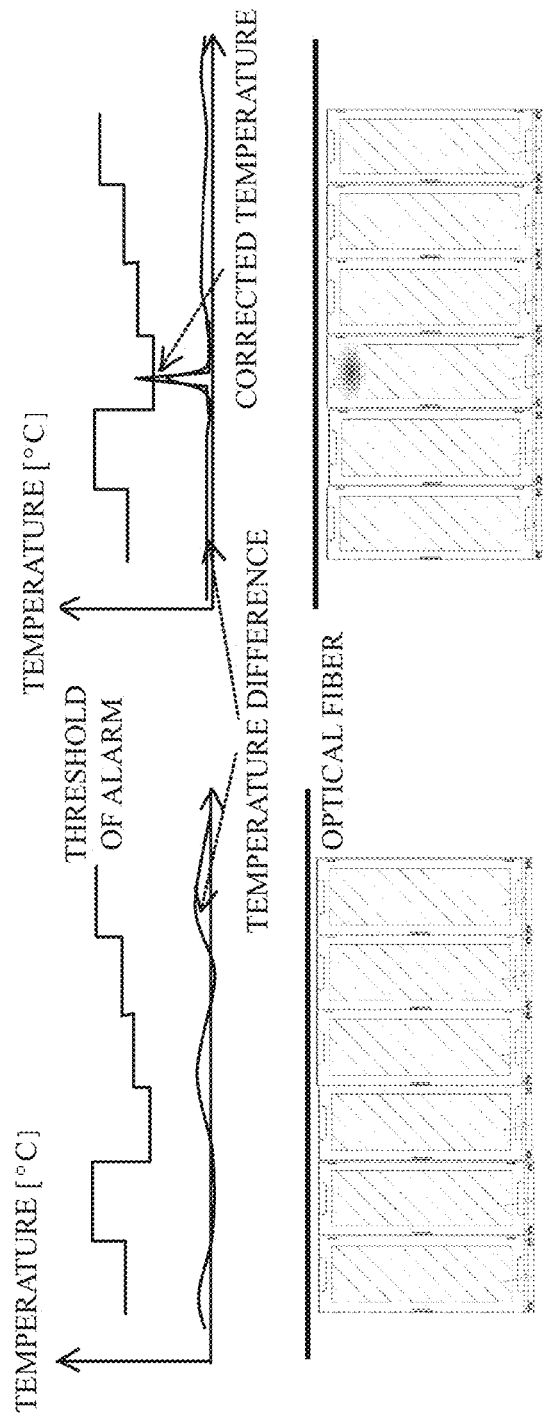

FIG. 27A and FIG. 27B illustrate an optical fiber applied to a system for performing an air-conditioning management with use of the optical fiber provided in a straight line on an upper position of a server rack in a data center. In a data center providing a housing service mainly, it may be forbidden to provide an optical fiber in a server rack. And so, as illustrated in FIG. 27A and FIG. 27B, the optical fiber is provided in a straight line on an upper part of an intake face of the server rack or the optical fiber is provided on an exhaust face side in a meandering shape. And, a temperature of a rack is measured by some methods in advance. An alarm threshold is set with respect to each length of the optical fiber corresponding to an upper part of each rack, by associating an allowable temperature degree detected from the optical fiber. Generally, a length of a server rack is 60 cm or 70 cm. When a sampling interval of data is 50 cm, the number of measurement point is one or two. Therefore, measurement accuracy of a measurement level of the double end method is desired. Therefore, it is possible to measure a temperature with high accuracy by applying the above-mentioned embodiment. It is possible to perform a control that an allowable degree is increased by energizing an air-conditioner when a temperature exceeds or is going to exceed a threshold. Accordingly, both energy saving and safety are achieved.

Figure 28:
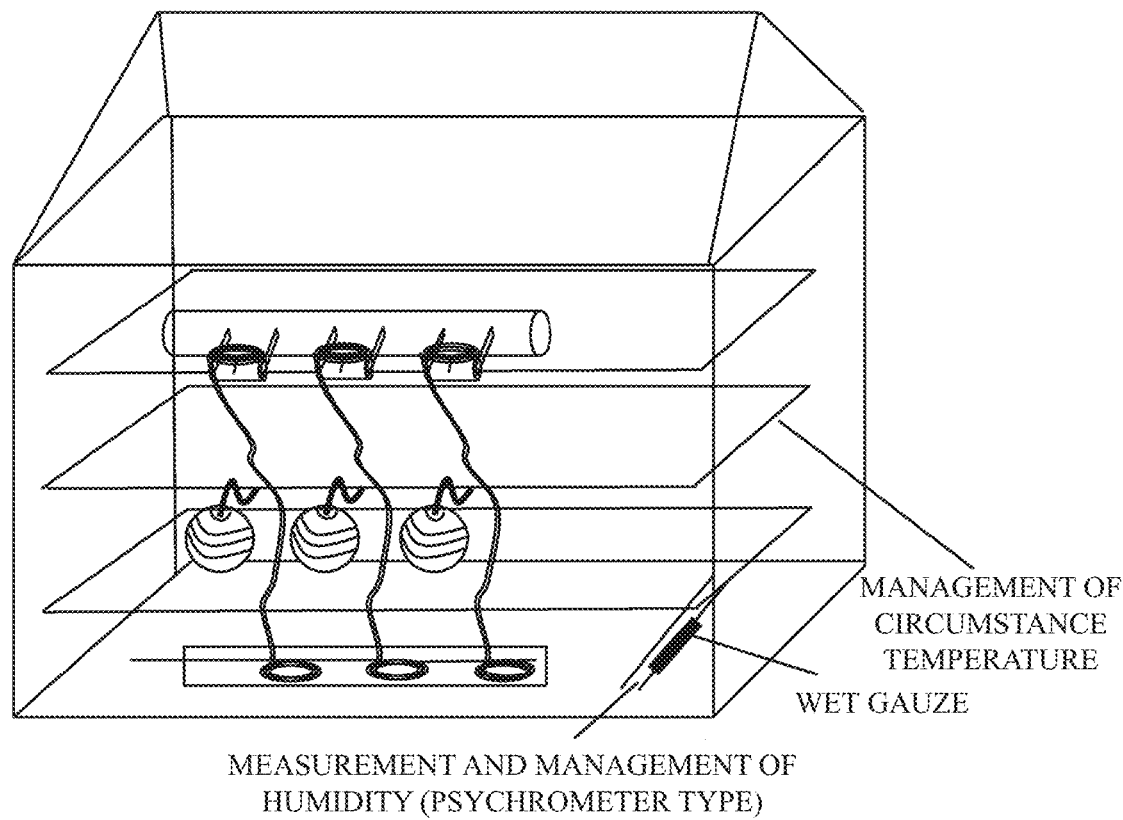
FIG. 28 illustrates another example.
Figure 28:
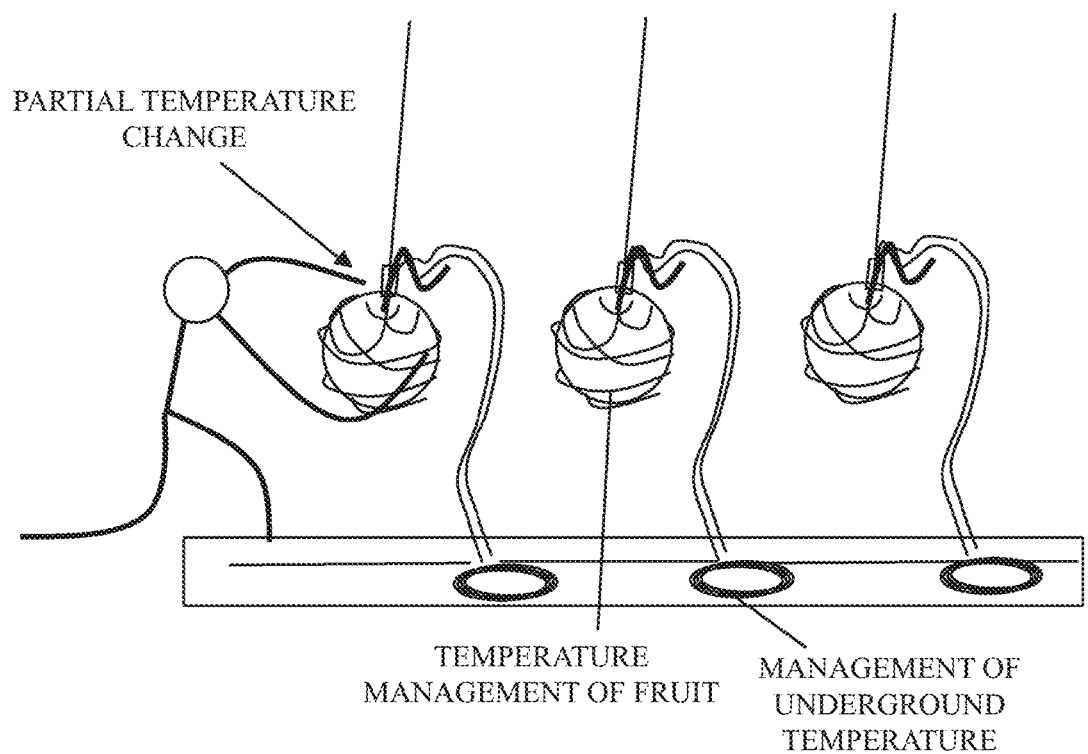

FIG. 28 illustrates an example of a cultivation and a theft prevention of an expensive fruit or the like in a vinyl house. In the example of FIG. 28, crown melons are cultivated. An optical fiber for measuring an underground temperature, a circumstance temperature, a fruit temperature and so on is provided. Moreover, an optical fiber for a humidity management using the same principle as a psychrometer. In this case, it is possible to measure a temperature and humidity with use of a Raman scattering. When a thief pulls a melon for steeling the melon, an underground part of an optical fiber is pulled out and the temperature is sharply changes. It is therefore possible to report an alarm to an owner. In order to measure the sharp temperature changing precisely, it is preferable that measurement accuracy of a system is preferable. Similarly, it is preferable that measurement accuracy of the system is preferable, when a time course of each temperature is managed in detail, an integrated value is managed, and the owner cultivate the melons with a preferable condition. When the above-mentioned embodiment is used, these demands are solved.

Example 1

In accordance with the above-mentioned embodiment, a description will be given of a concrete example. The process of FIG. 22 was performed with respect to FIG. 11 to FIG. 16, FIG. 18A, FIG. 18B and FIG. 19. However, the first section is less than $2/5$ of the total length of the optical fiber 30. The second section is equal to or more than $2/5$ and less than $3/5$. The third section is equal to or more than $3/5$. Thresholds for determining a degree of the correlation coefficient are a value 1 (=0.2) and a value 2 (=0.6) as well as FIG. 23.

Figure 29A:
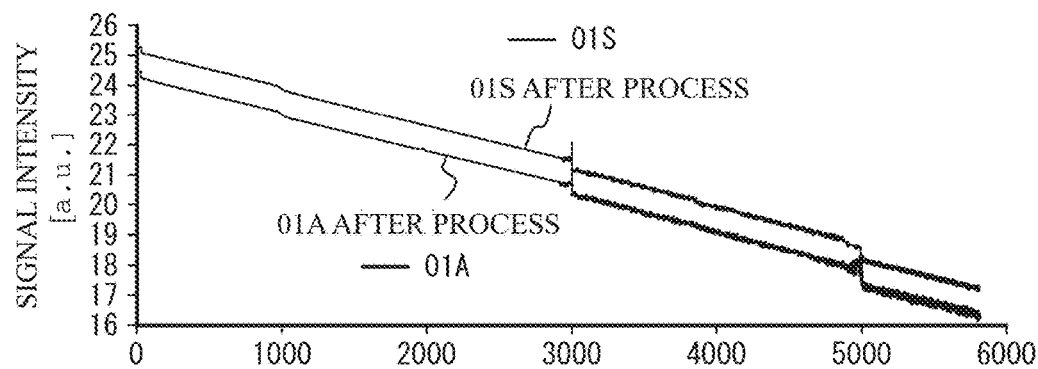
FIG. 29A to FIG. 29D illustrate calculated result.
Figure 29B:
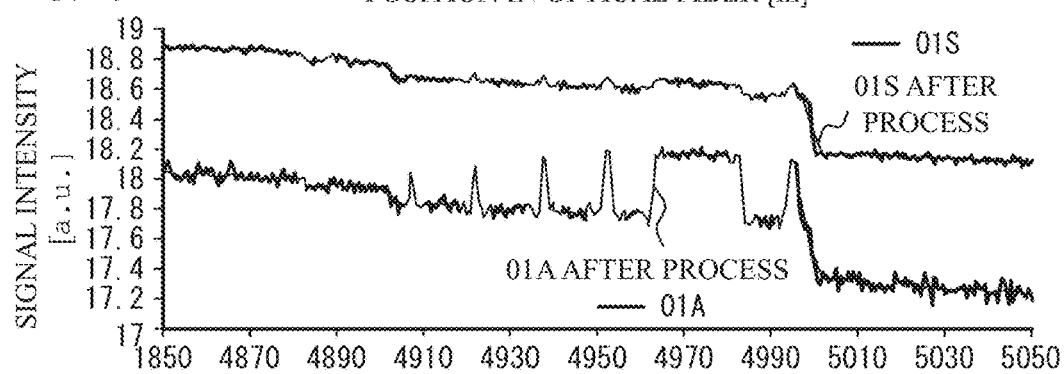
Figure 29C:
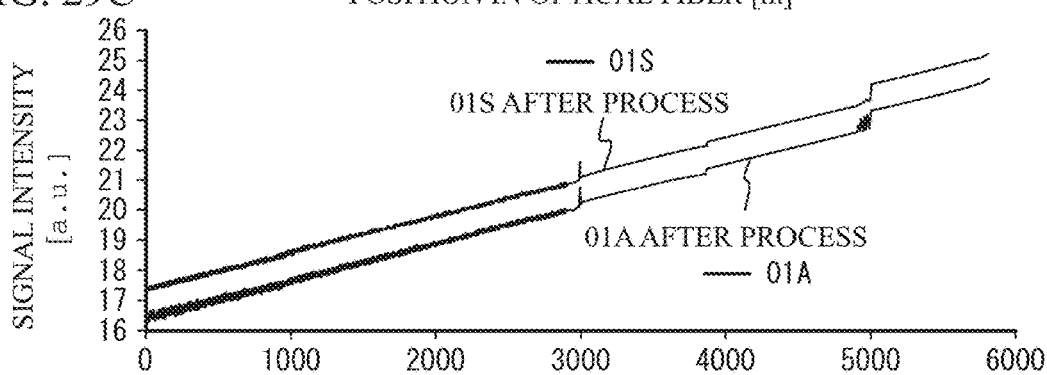
Figure 29D:
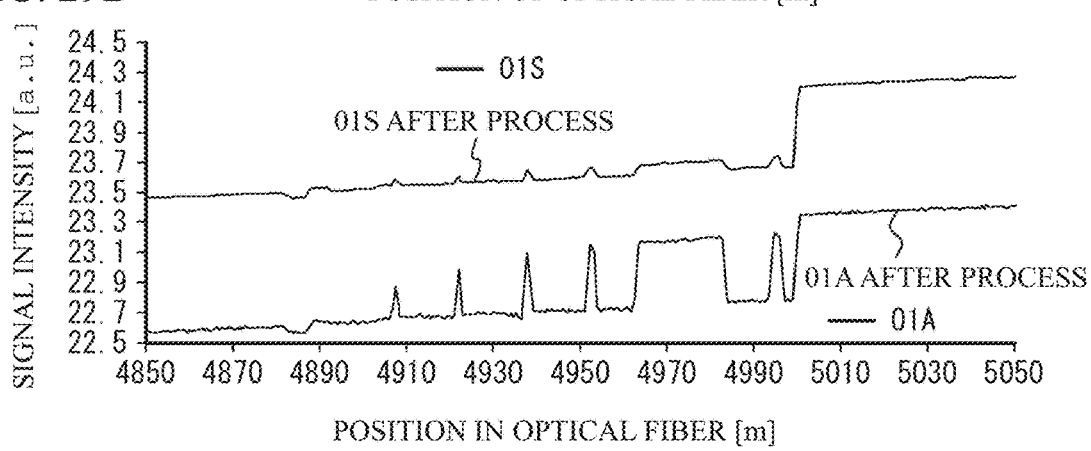

FIG. 29A to FIG. 29D illustrate results. FIG. 29A illustrates a comparison of 01S and 01A before the process and 01S and 01A after the process. As illustrated in FIG. 29A, before the process, there was variability on the distant end side. However, the variability was suppressed after the process. FIG. 29B illustrates an enlarged view of a region dipped in hot water. As illustrated in FIG. 29B, specifically, the variability of the anti-Stokes component before the process is greatly suppressed after the process. FIG. 29C illustrates a comparison of 02S and 02A before the process and 02S and 02A after the process. As illustrated in FIG. 29C, before the process, there was variability near the distant end of 0 (m). However, the variability was suppressed after the process. FIG. 29D illustrates an enlarged view of a region dipped in hot water. FIG. 29D is slightly improved, compared to FIG. 29B. However, FIG. 29D is closer to a case without the process. This is because a noise component is small at a near end.

Figure 30:
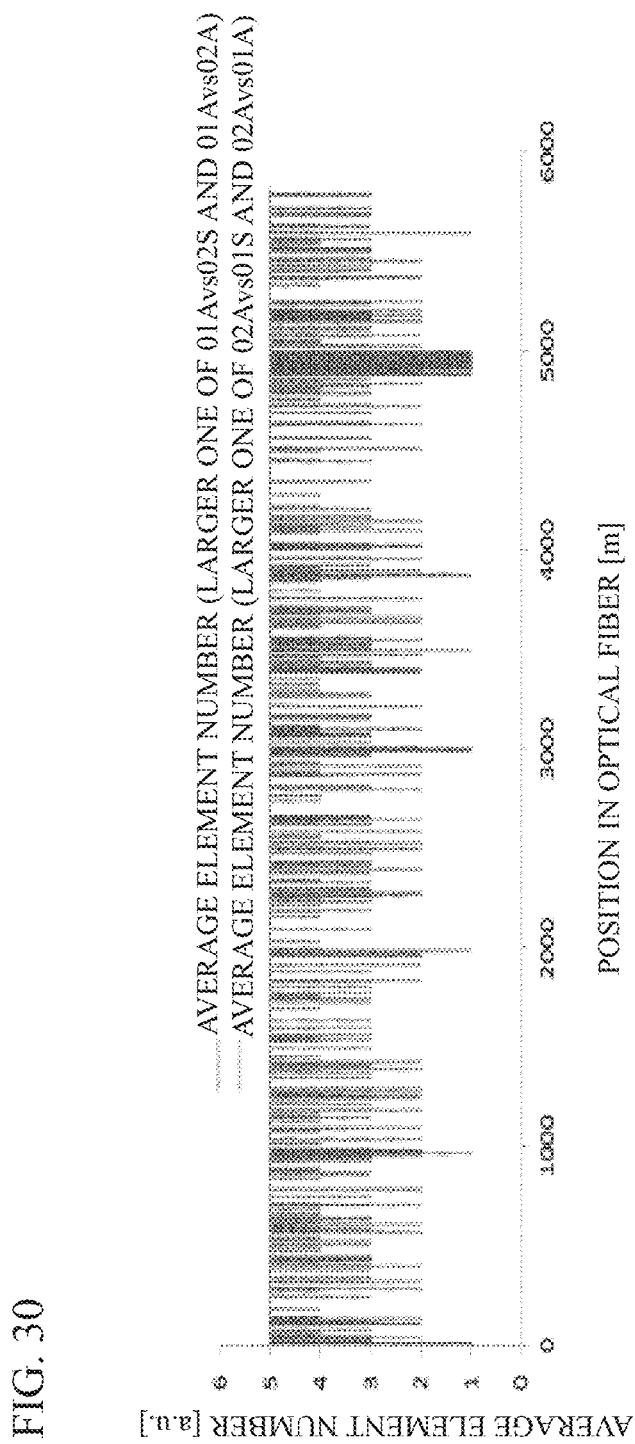
FIG. 30 illustrates a relationship between a number of average element of one side of 01A and a number of average element of one side of 02A.
Figure 31:
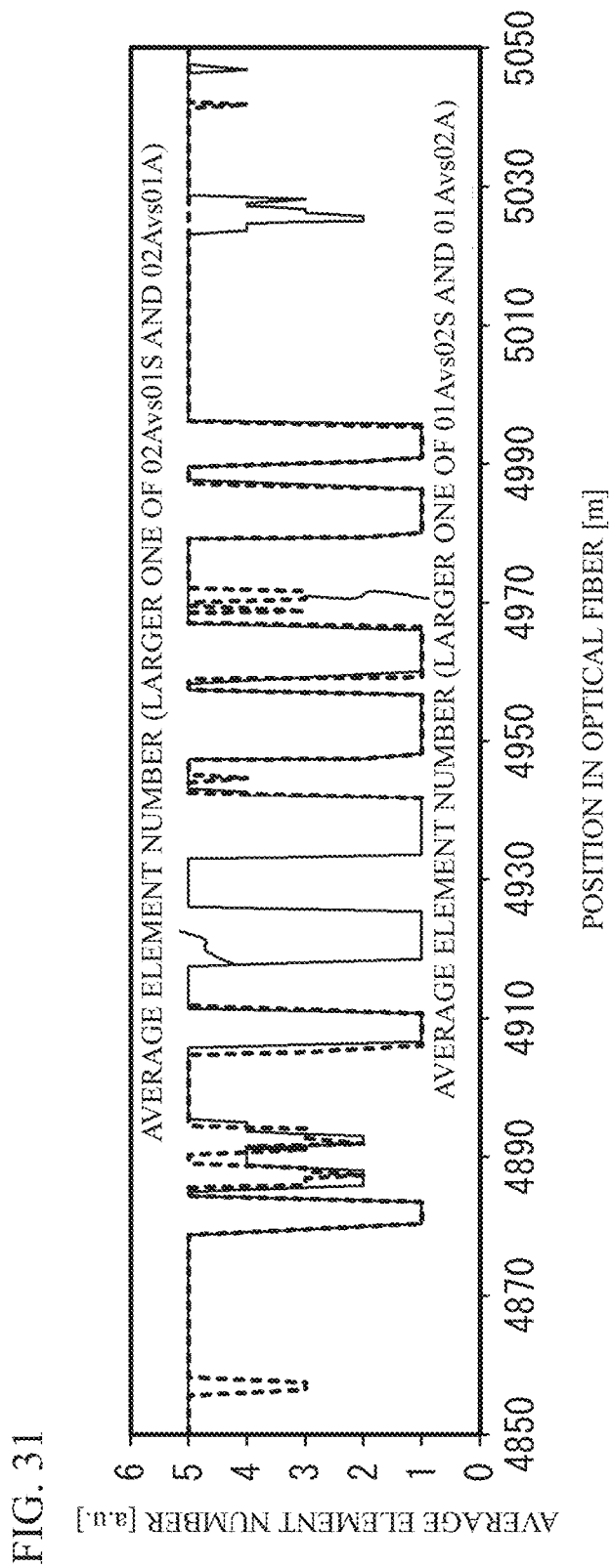
FIG. 31 illustrates a relationship between a number of average element of one side of 01A and a number of average element of one side of 02A.

FIG. 30 and FIG. 31 illustrate a relationship between the number of average element of one side of 01A and the number of average element of one side of 02A that are determined on the basis of the processes of FIG. 22 and FIG. 23. FIG. 31 illustrates a partially enlarged view of FIG. 30. The number of average element of one side corresponds to $1/\alpha\_01A$ and $1/\alpha\_02A$. When the number of average element is 3 or more, the substitute 01A and the substitute 02A are respectively used in the section of $3/5$ or more and the section of less than $2/5$.

Figure 32:
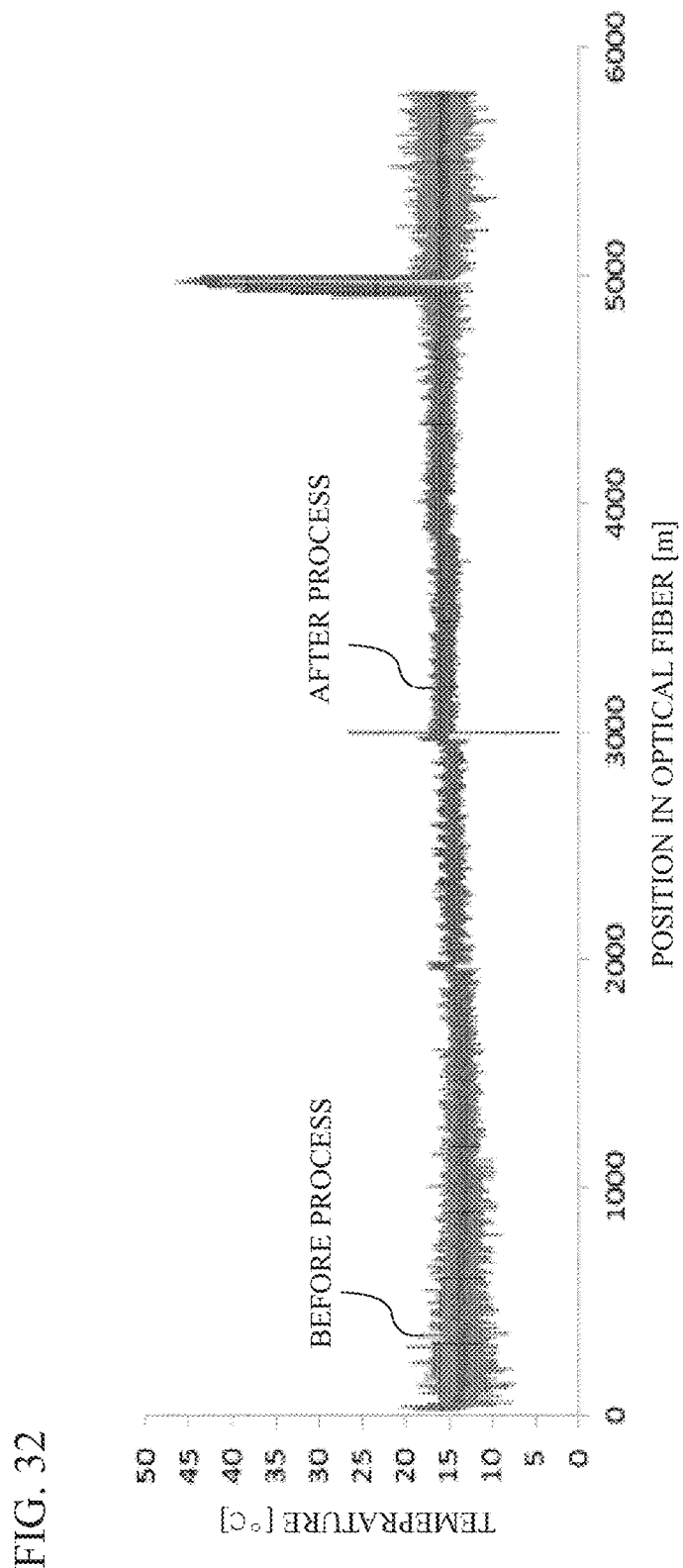
FIG. 32 illustrates a temperature calculated result of a double end method.
Figure 33:
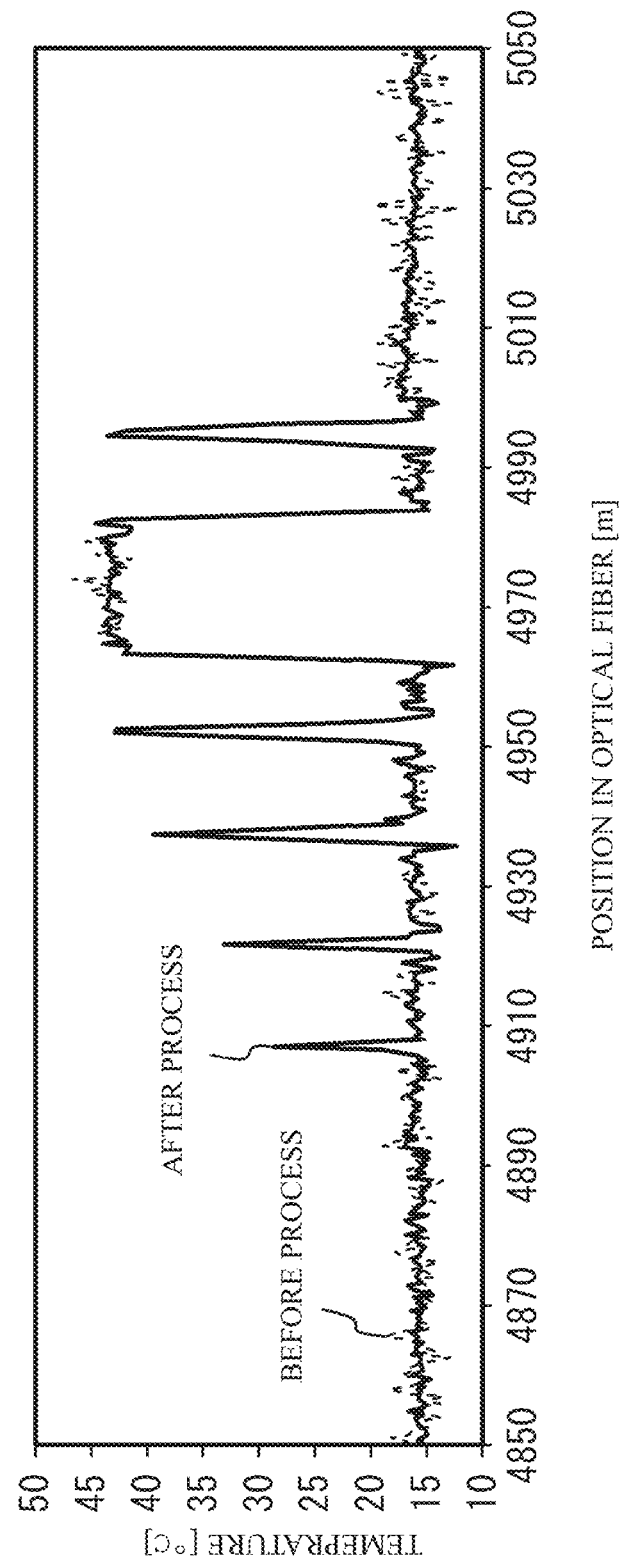
FIG. 33 illustrates a temperature calculated result of a double end method.

If FIG. 31 is compared with FIG. 29A to FIG. 29D, the values of FIG. 31 are approximately the same as those of FIG. 29A to FIG. 29D, when the temperature changes and both of the Stokes component and the anti-Stokes component change. FIG. 32 and FIG. 33 illustrate calculated temperature of the double end method from FIG. 29A to FIG. 29D, FIG. 30 and FIG. 31. When FIG. 32 and FIG. 33 that is enlarged view of the region dipped in the hot water are focused, the temperature changing is not lost and noise components are suppressed.

The temperatures of FIG. 32 and FIG. 33 were calculated with use of the above-mentioned formula (2). The number of average element is 1 at a position of which the correlation coefficient is 1. Therefore, the temperature before the process is the same as that after the process. It is necessary that the gain and the offset used after the substitution process are the same as those before the substitution process. Therefore, the temperature after the process is expressed by the following formula (11).

Temperature after the process=gain/{offset−2×ln(average of light amount of anti-Stokes after process/average of light amount of Stokes after process)} (11)

FIG. 34 illustrates a quantitative comparison of temperature distribution before the process and temperature distribution after the process. There is little changing before and after the process at a temperature changing position in any cases. Therefore, standard deviations $3\sigma$ at terrace portions are compared. As illustrated in FIG. 34, there is little changing in a value in a normal temperature calculation section of 2800 meters to 2900 meters. However, in a section where the process is performed, noise suppression of 83% or more is achieved. In a case where the suppression effect is 83% obtained by the process of the above-mentioned embodiment, the measurement accuracy is one times as 5.9 minutes. Therefore, with respect to the same measurement accuracy, the measurement time of 35 before the process is compressed to 1 after the process. During the measurement by the double end method of FIG. 11, the measurement accuracy at 100 meters to 200 meters and 5600 meters to 5700 meters is three times as that at a position of 2800 meters to 2900 meters. However, with the process of the above-mentioned embodiment, the measurement accuracy of the both sides is twice conversely.

Example 2

A description will be given of a concrete example of temperature distribution with respect to an object to be measured and a measurement cycle that are different from those of the example 1. An applied process method is approximately the same as that of the example 1. However, sections are two overlapped sections of less than $3/5$ and $2/5$ or more of the total length. Thus, in the overlapped sections, when the largeness of the correlation is small, all of 01A, 01S, 2A and 02S are replaced.

Figure 35A:
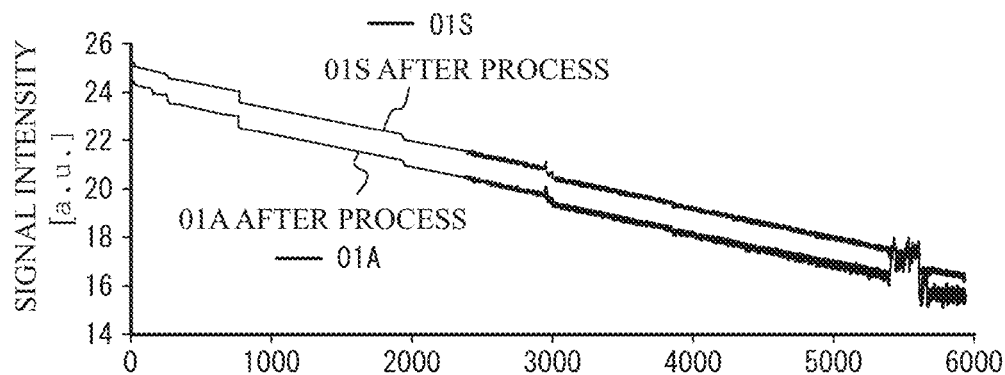
FIG. 35A to FIG. 35D illustrate calculated result.
Figure 35B:
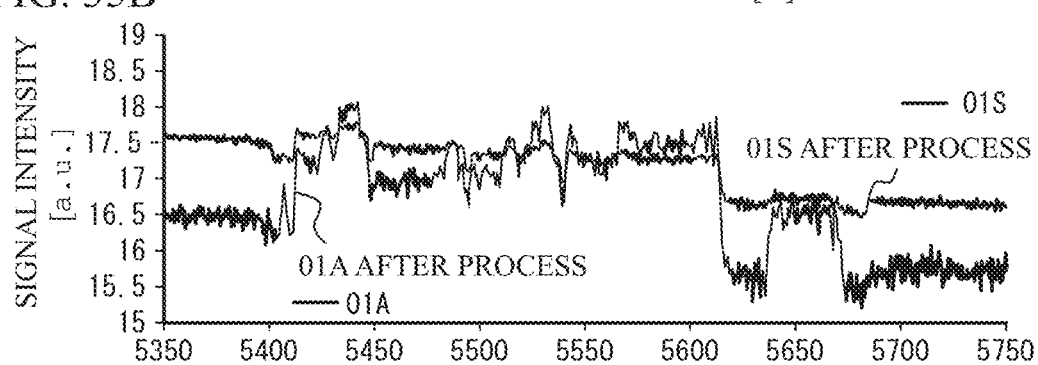
Figure 35C:
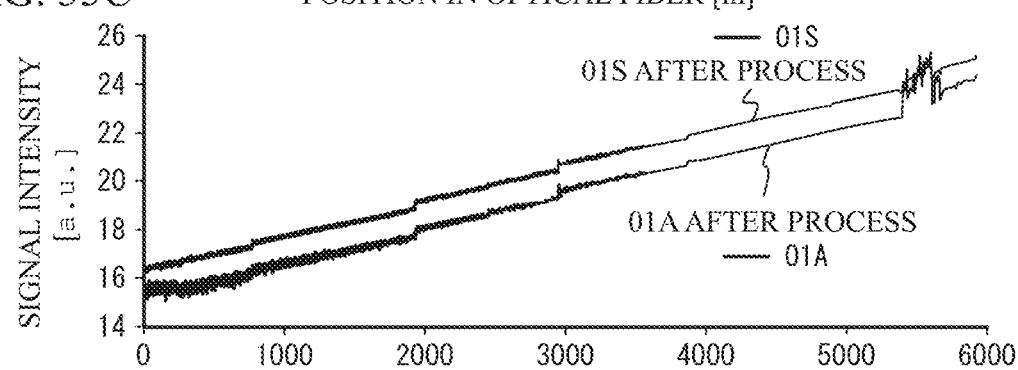
Figure 35D:
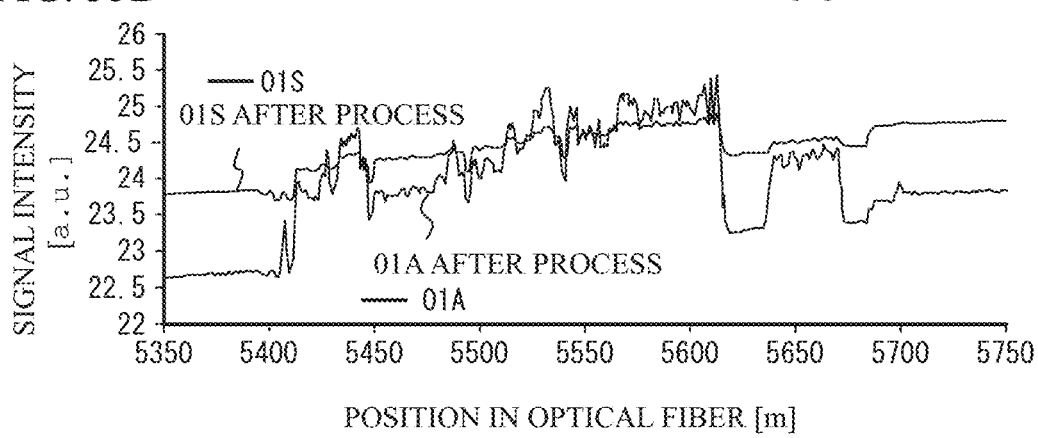

FIG. 35A to FIG. 35D illustrate results. FIG. 35A illustrates a comparison of 01S and 01A before the process and 01S and 01A after the process. As illustrated in FIG. 35A, before the process, there was variability on the distant end side. However, the variability was suppressed after the process. FIG. 35B illustrates an enlarged view of a heated region. As illustrated in FIG. 35B, specifically, the variability of the anti-Stokes component before the process is greatly suppressed after the process. FIG. 35C illustrates a comparison of 02S and 02A before the process and 02S and 02A after the process. As illustrated in FIG. 35C, before the process, there was variability near the distant end of 0 (m). However, the variability was suppressed after the process. FIG. 35D illustrates an enlarged view of a region dipped in hot water. FIG. 35D is slightly improved, compared to FIG. 35B. However, FIG. 35D is closer to a case without the process. This is because a noise component is small at a near end.

Figure 36:
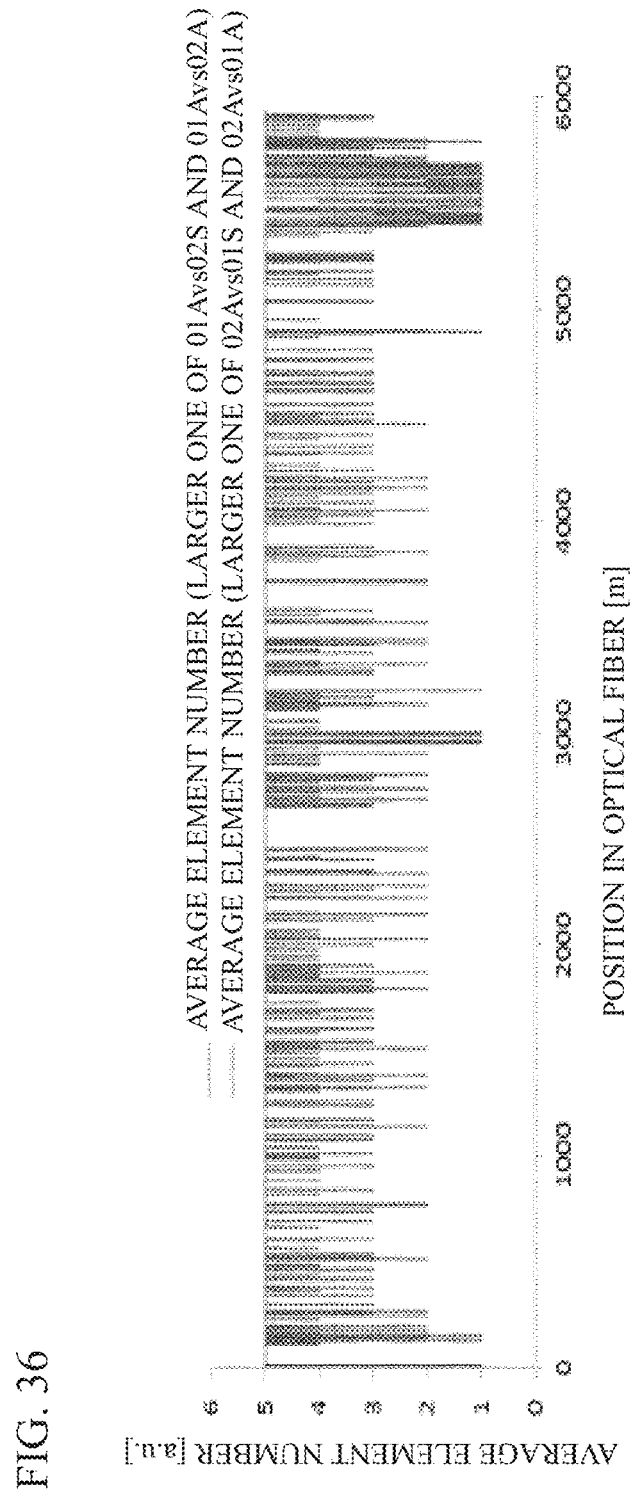
FIG. 36 illustrates a relationship between a number of average element of one side of 01A and a number of average element of one side of 02A.
Figure 37:
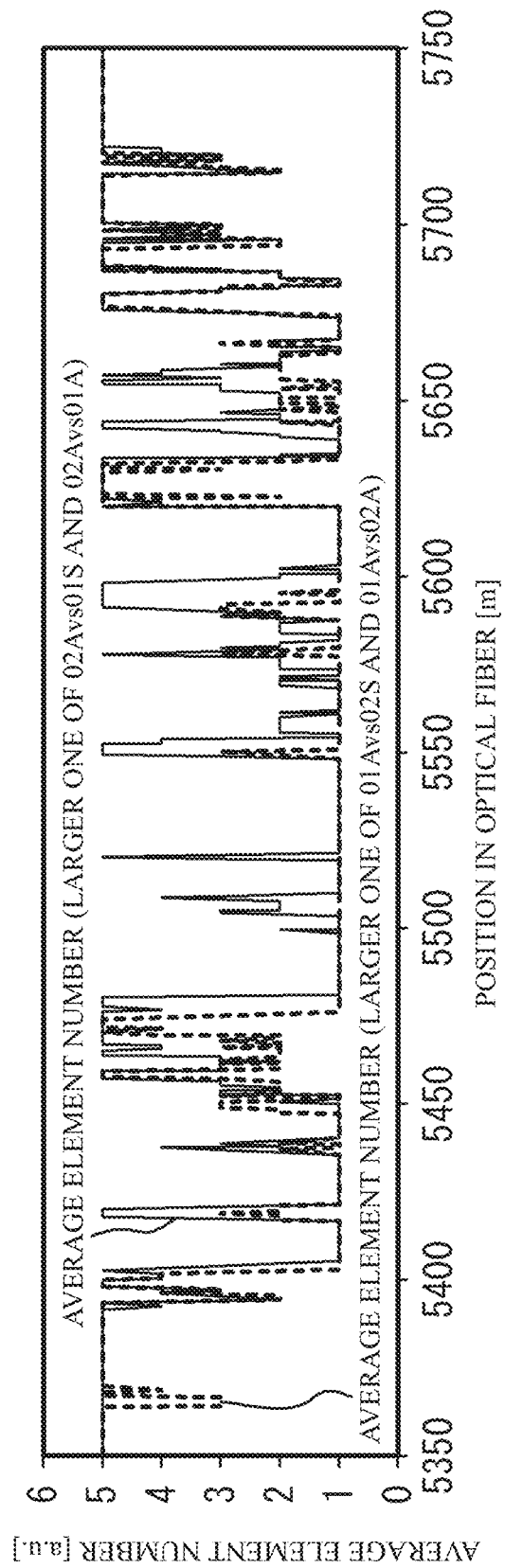
FIG. 37 illustrates a relationship between a number of average element of one side of 01A and a number of average element of one side of 02A.

FIG. 36 and FIG. 37 illustrate a relationship between the number of average element of one side of 01A and the number of average element of one side of 02A that are determined on the basis of the processes of FIG. 22 and FIG. 23. FIG. 37 illustrates a partially enlarged view of FIG. 36. The number of average element of one side corresponds to $1/\alpha\_01A$ and $1/\alpha\_02A$. When the number of average element is 3 or more, the substitute 01A and the substitute 02A are respectively used in the section of ⅔ or more and the section of less than ⅗.

If FIG. 37 is compared with FIG. 35A to FIG. 35D, the values of FIG. 37 are approximately the same as those of FIG. 35A to FIG. 35D, when the temperature changes and both of the Stokes component and the anti-Stokes component change. However, the number of the average element relating to 02A is slightly larger than that relating to 01A because the changing of 01S may be considered as a noise with respect to a small temperature changing among large temperature changing.

Figure 38:
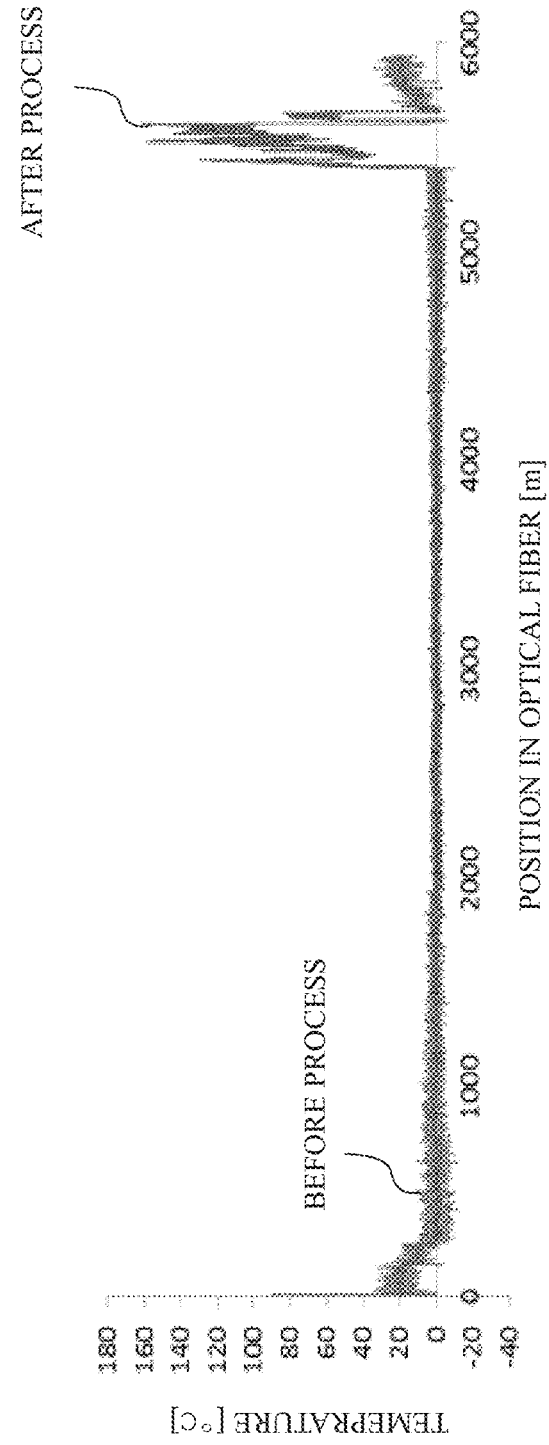
FIG. 38 illustrates a temperature calculated result of a double end method.
Figure 39:
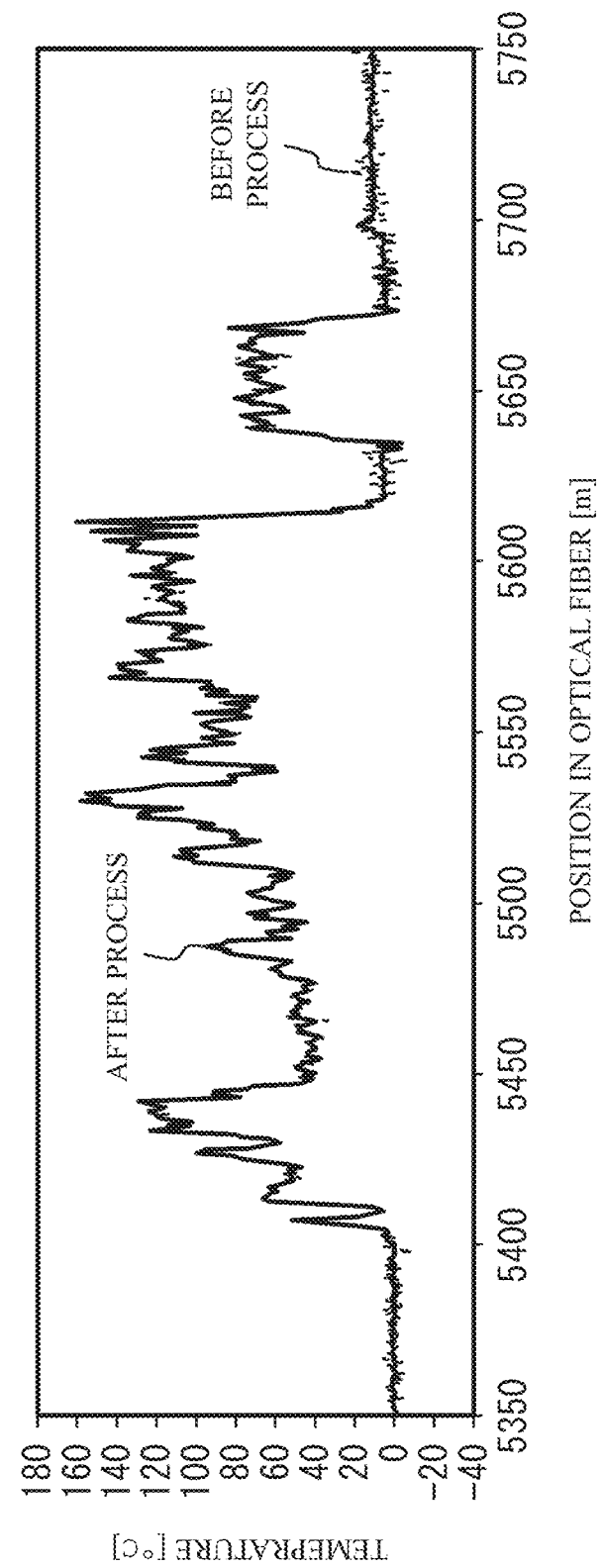
FIG. 39 illustrates a temperature calculated result of a double end method.

FIG. 38 and FIG. 39 illustrate calculation temperatures of the double end method from FIG. 35A to FIG. 35D, FIG. 36 and FIG. 37. When FIG. 38 and FIG. 39 that is enlarged view of the part dipped in the hot water are focused, the temperature changing is not lost and noise components are suppressed. It is possible to say that the difference between the two average elements of FIG. 37 is not a problem.

FIG. 40 illustrates a quantitative comparison between temperature distribution before the process and temperature distribution after the process. At a position of temperature changing, there is little change before and after the process in any cases. Therefore, standard deviation values 3σ at a terrace portion are compared with each other. By overlapping, a slight improvement is achieved even at a center portion of 2800 meters to 2900 meters. In the center section, noise is overlapped with 01A and 02A. It is therefore thought that little improvement is achieved even if 01A and 02A are replaced with each other. In contrast, on the both side sections, noise suppression of 86% or more is achieved. With the process of the above-mentioned embodiment, accuracy of the both sides is 1.5 times or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A temperature measurement device comprising:
    a detector configured to detect a first Stokes component and a first anti-Stokes component from a back scattering light generated when a light is input into a first end of an optical fiber and detect a second Stokes component and a second anti-Stokes component from a back scattering light generated when a light is input into a second end of the optical fiber;
    a memory; and
    a processor configured to execute a process, the process comprising:
    within a predetermined region including a sample point of a partial region on the first end side of the optical fiber, replacing the second anti-Stokes component with a value according to the first Stokes component, the first anti-Stokes component and the second Stokes component when any one of correlations of the second anti-Stokes component to the first Stokes component and the first anti-Stokes component is less than or equal to a threshold value; and
    measuring a temperature at the sample point by using the first Stokes component, the first anti-Stokes component, the second Stokes component, and the second anti-Stokes component that is replaced in the replacing.

2. The temperature measurement device as claimed in claim 1 further comprising:
    an optical switch configured to alternately input a light from a light source to the first end and the second end,
    wherein in the replacing, the second anti-Stokes component is replaced with a value according to the first Stokes component, the first anti-Stokes component and the second Stokes component that is detected together with the second anti-Stokes component at a same timing when any one of correlations of the first Stokes component and the first anti-Stokes component of a case where the light is input into the first end from the optical switch to the second anti-Stokes component of a case where the light is input into the second end from the optical switch next time is less than or equal to the threshold value.

3. The temperature measurement device as claimed in claim 1, wherein:
    In the replacing, as the second Stoked component, a smoothed value of the second Stokes component in a predetermined variable range including the sample point is used when replacing the second anti-Stokes component with a value according to the first Stokes component, the first anti-Stokes component and the second Stokes component; and
    the variable range has a length according to any one of correlations of the first Stokes component and the first anti-Stokes component to the second Stokes component at the sample point.

4. The temperature measurement device as claimed in claim 3, wherein the variable range is elongated as the correlation becomes smaller.

5. The temperature measurement device as claimed in claim 3, wherein, in the replacing. an upper limit is set in the variable range.

6. The temperature measurement device as claimed in claim 1, wherein, in the replacing,
    a smoothed value of the first Stokes component, a smoothed value of the first anti-Stokes component, a smoothed value of the second Stokes component and a smoothed value of the second anti-Stokes component in a predetermined fixed range including the sample point are further used when replacing the second anti-Stokes component with the value according to the first Stokes component, the first anti-Stokes component and the second Stokes component.

7. The temperature measurement device as claimed in claim 1 wherein the second anti-Stokes component is not replaced when the correlation is equal to or more than a threshold.

8. The temperature measurement device as claimed in claim 1, wherein, in the replacing, a Pearson's product-moment correlation coefficient is used as a largeness of the correlation.

9. The temperature measurement device as claimed in claim 1, wherein, in the replacing, a Spearman's rank correlation coefficient is used as a largeness of the correlation.

10. The temperature measurement device as claimed in claim 1, wherein:
  a partial region of the optical fiber around the sample point has a constant temperature;
  the predetermined region is larger than a half value width of temperature distribution obtained when another constant temperature different from the constant temperature is given to a minimum heated length section of which a center is the sample point; and
  the predetermined region is smaller than a primary component width of the temperature distribution.

11. A temperature measurement method characterized by comprising:
  with a detector, detecting a first Stokes component and a first anti-Stokes component from a back scattering light generated when a light is input into a first end of an optical fiber and detecting a second Stokes component and a second anti-Stokes component from a back scattering light generated when a light is input into a second end of the optical fiber;
  within a predetermined region including a sample point of a partial region on the first end side of the optical fiber, replacing the second anti-Stokes component with a value according to the first Stokes component, the first anti-Stokes component and the second Stokes component when any one of correlations of the second anti-Stokes component to the first Stokes component and the first anti-Stokes component is less than or equal to a threshold value; and
  measuring a temperature at the sample point by using the first Stokes component, the first anti-Stokes component, the second Stokes component, and the second anti-Stokes component that is replaced by the replacing.

12. The temperature measurement method as claimed in claim 11, wherein
  in the replacing, the second anti-Stokes component is replaced with a value according to the first Stokes component, the first anti-Stokes component and the second Stokes component that is detected together with the second anti-Stokes component at a same timing when any one of correlations of the first Stokes component and the first anti-Stokes component of a case where the light is input into the first end to the second anti-Stokes component of a case where the light is input into the second end next time is less than or equal to the threshold value.

13. The temperature measurement method as claimed in claim 11, wherein:
  in the replacing, as the second Stoked component, a smoothed value of the second Stokes component in a predetermined variable range including the sample point is used when replacing the second anti-Stokes component with a value according to the first Stokes component, the first anti-Stokes component and the second Stokes component; and
  the variable range has a length according to any one of correlations of the first Stokes component and the first anti-Stokes component to the second Stokes component at the sample point.

14. The temperature measurement method as claimed in claim 13, wherein the variable range is elongated as the correlation becomes smaller.

15. The temperature measurement method as claimed in claim 13, wherein, in the replacing an upper limit is set in the variable range.

16. The temperature measurement method as claimed in claim 11, wherein, in the replacing,
  a smoothed value of the first Stokes component, a smoothed value of the first anti-Stokes component, a smoothed value of the second Stokes component and a smoothed value of the second anti-Stokes component in a predetermined fixed range including the sample point are further used when replacing the second anti-Stokes component with the value according to the first Stokes component, the first anti-Stokes component and the second Stokes component.

17. The temperature measurement method as claimed in claim 11 wherein the second anti-Stokes component is not replaced when the correlation is equal to or more than a threshold.

18. The temperature measurement method as claimed in claim 11, wherein, in the replacing, a Pearson's product-moment correlation coefficient is used as a largeness of the correlation.

19. The temperature measurement method as claimed in claim 11, wherein, in the replacing, a Spearman's rank correlation coefficient is used as a largeness of the correlation.

20. A computer-readable, non-transitory medium storing a program that causes a computer to execute a process, the process comprising:
  detecting a first Stokes component and a first anti-Stokes component from a back scattering light generated when a light is input into a first end of an optical fiber and detecting a second Stokes component and a second anti-Stokes component from a back scattering light generated when a light is input into a second end of the optical fiber;
  within a predetermined region including a sample point of a partial region on the first end side of the optical fiber, replacing the second anti-Stokes component with a value according to the first Stokes component, the first anti-Stokes component and the second Stokes component when any one of correlations of the second anti-Stokes component to the first Stokes component and the first anti-Stokes component is less than or equal to a threshold value; and
  measuring a temperature at the sample point by using the first Stokes component, the first anti-Stokes component, the second Stokes component, and the second anti-Stokes component that is replaced by the replacing.

* * * * *